US009823762B2

(12) United States Patent
Choi et al.

(10) Patent No.: US 9,823,762 B2
(45) Date of Patent: Nov. 21, 2017

(54) METHOD AND APPARATUS FOR CONTROLLING ELECTRONIC DEVICE USING TOUCH INPUT

(71) Applicant: SAMSUNG ELECTRONICS CO., LTD., Suwon-si, Gyeonggi-do (KR)

(72) Inventors: Bo-Kun Choi, Seoul (KR); Cheol-Ho Cheong, Seoul (KR); Sun-Kee Lee, Seongnam-si (KR); Jin-Hong Jeong, Yongin-si (KR); Joon-Young Cho, Suwon-si (KR)

(73) Assignee: Samsung Electronics Co., Ltd., Sunwon-si, Gyeonggi-do (KR)

( * ) Notice: Subject to any disclaimer, the term of this patent is extended or adjusted under 35 U.S.C. 154(b) by 146 days.

(21) Appl. No.: 14/748,690

(22) Filed: Jun. 24, 2015

(65) Prior Publication Data

US 2016/0077620 A1 Mar. 17, 2016

(30) Foreign Application Priority Data

Sep. 16, 2014 (KR) .................. 10-2014-0122975

(51) Int. Cl.
*G06F 3/041* (2006.01)
*G06F 3/0488* (2013.01)

(52) U.S. Cl.
CPC ............ *G06F 3/041* (2013.01); *G06F 3/0488* (2013.01); *G06F 3/04883* (2013.01); *G06F 2203/04808* (2013.01)

(58) Field of Classification Search
CPC ........ G06F 3/041–3/047; G06F 3/0488; G06F 3/04883; G06F 3/017; G06F 2203/04101–2203/04113; G06F 2203/04808

USPC .......... 345/173–178; 178/18.01–18.09, 18.11
See application file for complete search history.

(56) References Cited

U.S. PATENT DOCUMENTS

| 2003/0122787 | A1* | 7/2003 | Zimmerman | ....... G06F 3/04883 345/173 |
| 2006/0001650 | A1* | 1/2006 | Robbins | ................ G06F 3/0421 345/173 |
| 2008/0168395 | A1* | 7/2008 | Ording | ................ G06F 3/04847 715/833 |
| 2011/0154266 | A1* | 6/2011 | Friend | .................... A63F 13/06 715/863 |

(Continued)

FOREIGN PATENT DOCUMENTS

| KR | 10-2010-0114283 | 10/2010 |
| KR | 10-2012-0130972 | 12/2012 |

*Primary Examiner* — Stephen Sherman
(74) *Attorney, Agent, or Firm* — Nixon & Vanderhye P.C.

(57) ABSTRACT

An electronic device for controlling at least one function based on a user input, and a control method for the electronic device are provided. According to various example embodiments, an electronic device that operates based on a user input may acquire a gesture through an input area of a display unit functionally connected to the electronic device. The electronic device may perform at least one function of the electronic device, based on various variables (for example, a time period for which the gesture is sensed, a size of an area in which the gesture is sensed, a direction in which the gesture moves, or intensity at which the gesture is sensed, through the input area) corresponding to the acquired gesture. Various other example embodiments are disclosed.

18 Claims, 17 Drawing Sheets

(56) References Cited

U.S. PATENT DOCUMENTS

2013/0067373 A1\* 3/2013 Weir ...................... G06F 3/033
715/769

\* cited by examiner ously control (for example, scroll, zoom in/out, or move) information displayed through the display by multi-touching the display with two fingers of his/her one hand. In this case, the user
METHOD AND APPARATUS FOR CONTROLLING ELECTRONIC DEVICE USING TOUCH INPUT

CROSS-REFERENCE TO RELATED APPLICATION(S)

This application claims the benefit under 35 U.S.C. §119(a) of a Korean patent application filed in the Korean Intellectual Property Office on Sep. 16, 2014 and assigned Serial No. 10-2014-0122975, the entire disclosure of which is incorporated herein by reference.

TECHNICAL FIELD

Embodiments of the present disclosure relate to a method and apparatus for controlling an electronic device, and more particularly, to a method and apparatus for controlling an electronic device using a touch input.

BACKGROUND

With improvement in performance of electronic devices (for example, smart phones), an electronic device includes various kinds of input/output units in order to provide users with various information. For example, an electronic device can receive a touch input (or a hovering input or a gesture input) from a user through a display (e.g., a touch screen with a touch panel) to display various information of the electronic device for the user. As an input unit (e.g., a touch screen) capable of receiving (e.g., directly receiving) inputs from a user through a display that displays information of the electronic device is used as an input unit of the electronic device, the user can control various information displayed through the display by directly touching the surface of the display, hovering (e.g., non-contact recognition of a location on the surface of the display) over the display, or taking a predetermined gesture on/over the display, to thereby perform various interactions (e.g., transmitting various information to other electronic devices, turning on/off the display of the electronic device, adjusting the volume of the electronic device, adjusting the brightness of the display, or controlling functions of applications).

For example, the electronic device can control (e.g., moving or copying various information to another electronic device or a scroll function of the display) various information displayed through the display, based on a user's input acquired through a touch panel (e.g., a capacitive touch panel, an electronic pen recognition touch panel, or a resistive touch panel). Also, the electronic device provides a user with a multi-touch function and a gesture recognition function so that the user can intuitively and easily control information of the electronic device. For example, the user can easily zoom in/out a picture with his/her two fingers, and turn over web pages quickly through flicker operation (e.g., grazing through the display or moving an object quickly on/over the display).

An aspect of the present disclosure is to address problems and/or disadvantages and to provide at least the advantages described below. Accordingly, an aspect of the present disclosure is to provide an electronic device which is capable of acquiring location values (for example, coordinates of a touch point) of a location input to the display by one of various kinds of input means (for example, a user's body part, an electronic pen, etc.), of determining a touch area corresponding to the location values on the display, and of performing operation (for example, executing an application when an icon of the application is located at the touch area) corresponding to the touch area.

Another aspect of the present disclosure is to provide an electronic device which is capable of controlling applications or functions based on a user's multi-touch input that is applied to a plurality of areas on the display. For example, the user may touch (for example, multi-touch) different areas on the display with a plurality of fingers. In this case, the electronic device may determine location values corresponding to the plurality of fingers, respectively, and acquire information about a plurality of touch areas (for example, a plurality of touch points) corresponding to the plurality of fingers according to the location values.

Also, the electronic device may determine changes of the plurality of touch areas (for example, the plurality of touch points) according to changes of the location values, and perform different operations according to the changes of the plurality of touch areas. For example, when a plurality of areas corresponding to touch points move away from each other, the electronic device may zoom in a map or picture displayed on the display. In contrast, when the plurality of areas corresponding to the touch points move toward each other, the electronic device may zoom out the map or picture displayed on the display.

As the size (for example, the area of the display) of the electronic device increases, a user may have difficulties in controlling the electronic device through a multi-touch input while holding the electronic device with his/her one hand. For example, the user may successively control (for example, scroll, zoom in/out, or move) information displayed through the display by multi-touching the display with two fingers of his/her one hand. In this case, the user may have difficulties in zooming in a picture to a desired size that is displayed on the display through a single touch and drag operation, due to limitation such as short distances between the fingers of one hand. Accordingly, the user needs to perform several multi-touch and drag operations in order to zoom in the picture to the desired size.

Further, a user who possesses an electronic device with a large screen display may experience difficulties in controlling the electronic device with his/her one hand. For example, a user who possesses an electronic device with a small screen display can move an object displayed on the display to another location using a thumb finger of his/her one hand while holding the electronic device with the same hand. However, a user who possesses an electronic device with a large screen display may not touch all areas of the display with his/her thumb finger. In order to move an object displayed on the electronic device from a first location (for example, an area that the thumb finger of the hand holding the electronic device can approach) to a second location (for example, an area that the thumb finger of the hand holding the electronic device cannot approach), the user needs to apply a plurality of inputs to the display until the object is positioned at the second location.

The above information is presented as background information only to assist with an understanding of the present disclosure. No determination has been made, and no assertion is made, as to whether any of the above might be applicable as prior art with regard to the present disclosure.

SUMMARY

An aspect of various embodiments of the present disclosure is to provide a method and apparatus for enabling a user to control functions of various electronic devices based on a size, a direction, intensity, or a time period of a gesture input through a display.

In accordance with an aspect of the present disclosure, there is provided a control method in an electronic device, including: determining an input area of a display unit functionally connected to the electronic device, the input area corresponding to a first gesture acquired through the display unit; determining a second gesture through at least one part of the input area; and adjusting or controlling at least one function of the electronic device, according to at least one of a time period for which the second gesture is sensed, a size of an area in which the second gesture is sensed, intensity at which the second gesture is sensed, or a movement direction in which the first gesture moves to the second gesture, in the at least one part of the input area.

Other aspects, advantages, and salient features of the disclosure will become apparent to those skilled in the art from the following detailed description, which, taken in conjunction with the accompanying drawings, discloses exemplary embodiments of the disclosure.

BRIEF DESCRIPTION OF THE DRAWINGS

The above and other aspects, features and advantages of certain exemplary embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
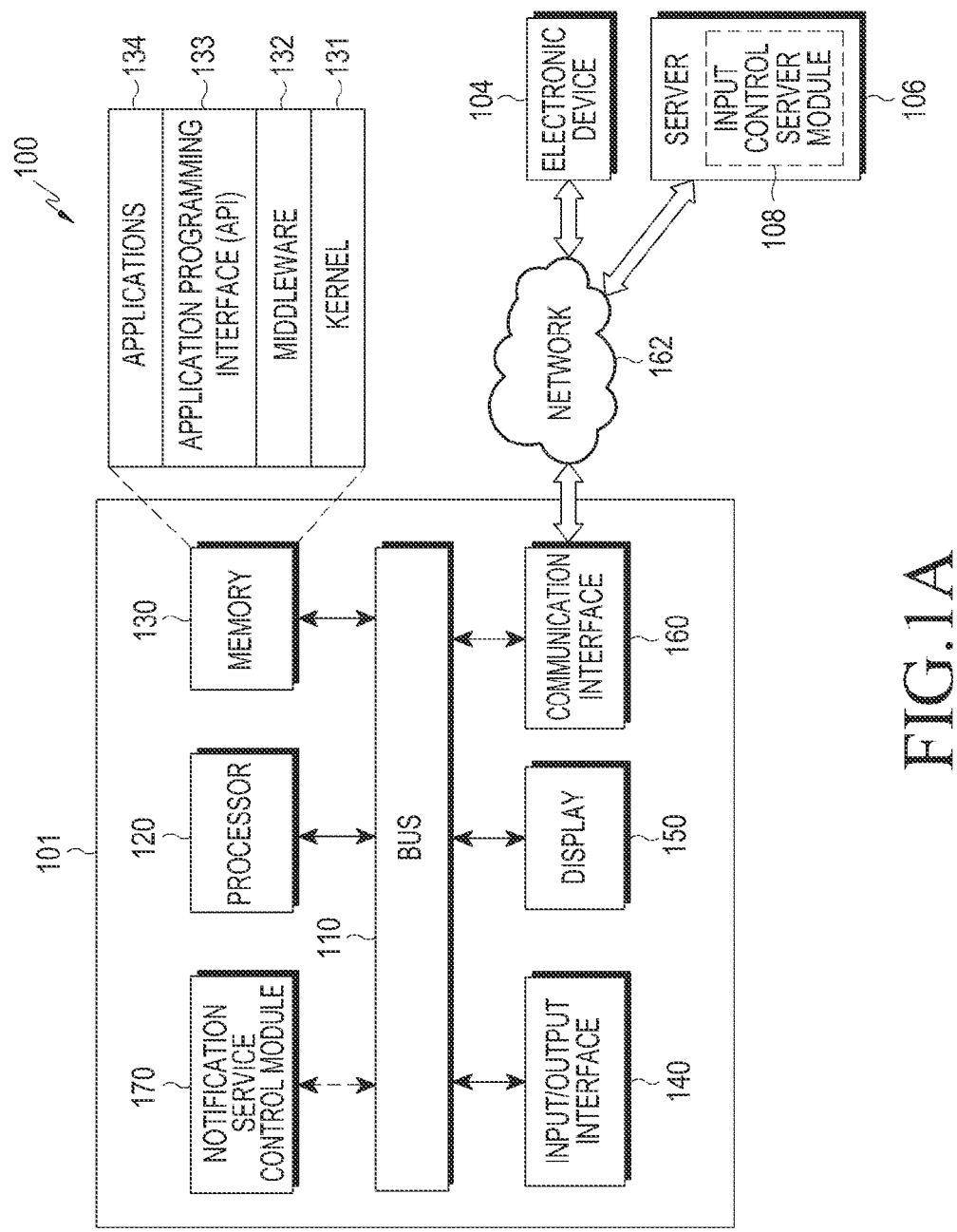
FIG. 1A illustrates a network environment including an electronic device according to various embodiments of the present disclosure.

Hereinafter, the present disclosure will be described with reference to the accompanying drawings. While the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure. Like reference numerals refer to like elements throughout the description of the figures.

It will be understood that the terms "comprises", "may comprise,", "includes" and/or "may include", when used herein, specify the presence of stated functions, operations, and/or components, but do not preclude the presence or addition of one or more other functions, steps, and/or components. It will be further understood that the terms "comprises" or "has", when used herein, specify the presence of stated features, integers, steps, operations, elements, components and/or groups thereof, but do not preclude the presence or addition of one or more other features, integers, steps, operations, elements, components, and/or groups thereof.

As used herein, the term "or" includes any and all combinations of one or more of the associated listed items. For example, "A and/or B" may include A, B, or both A and B.

It will be understood that, although the terms first, second, etc. may be used herein to describe various components, these components should not be limited by these terms. For example, the terms do not limit the order and/or importance of the components. These terms are only used to distinguish one component from another. For example, a first user device and a second user device that are user devices indicate different user devices. For example, a first component could be termed a second component, and, similarly, a second component could be termed a first component, without departing from the scope of the present disclosure.

It will be understood that when a component is referred to as being "connected" or "coupled" to another component, it can be directly connected or coupled to the other component or intervening components may be present. In contrast, when a component is referred to as being "directly connected" or "directly coupled" to another component, there are no intervening components present. The terminology used herein is for the purpose of describing particular embodiments only and is not intended to be limiting of the invention.

As used herein, the singular forms "a", "an" and "the" are intended to include the plural forms as well, unless the context clearly indicates otherwise.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

An electronic device according to various exemplary embodiments of the present disclosure may be a device with communication capabilities. For example, the electronic device may be at least one of a smart phone, a tablet Personal Computer (PC), a mobile phone, a video phone, an e-Book reader, a desktop PC, a laptop PC, a Netbook computer, a Personal Digital Assistant (PDA), a Portable Multimedia Player (PMP), a MP3 player, mobile medical equipment, a camera, or a wearable device (e.g., a Head-Mounted-Device (HMD) such as electronic glasses, electronic clothes, electronic bracelet, electronic band, electronic necklace, electronic Appcessory, or a smart watch).

According to some embodiments, the electronic device may be a smart home appliance with communication capacity. The smart home appliance may be at least one of a Television (TV), a Digital Versatile Disk (DVD) player, audio equipment, a refrigerator, an air conditioner, a cleaner, an oven, a microwave, a washing machine, an air cleaner, a set-top box, a TV box (for example, Samsung HomeSync™, Apple TV™, or Google TV™), game consoles, electronic dictionary, a camcorder, or an electronic album.

According to some embodiments, the electronic device may be at least one of various medical equipment (for example, Magnetic Resonance Angiography (MRA), Magnetic Resonance Imaging (MRI), Computed Tomography (CT), medical camcorder, ultrasonic equipment, and the like), a navigation device, a Global Positioning System (GPS) receiver, an Event Data Recorder (EDR), a Flight Data Recorder (FDR), an automotive infotainment device, electronic equipment for ship (for example, marine navigation device, gyro compass, and the like), avionics, security equipment, or, an industrial or home robot.

According to some embodiments, the electronic device may be at least one of furniture or part of building/structure with communication capability, an electronic board, an electronic signature receiving device, a projector, or various metering equipment (for example, water, electricity, gas, or waves metering equipment). Also, the electronic device may be one of the aforementioned devices or a combination of one or more of the aforementioned devices.

Hereinafter, an electronic device according to various embodiments of the present disclosure will be described with reference to the accompanying drawings. In the following description, the term "user" may indicate a person or an apparatus (for example, an intelligent electronic device) that uses the electronic device.

FIG. 1A illustrates a network environment 100 including an electronic device 101 according to various embodiments of the present disclosure. Referring to FIG. 1A, the electronic device 100 may include a bus 110, a processor 120, a memory 130, an input/output interface 140, a display unit 150, a communication interface 160, and an input control module 170.

The bus 110 may be a circuit that connects the aforementioned components to each other, and enables communications (for example, transferring of control messages) between the components.

The processor 120 may receive a command from the other components (for example, the memory 130, the input/output interface 140, the display unit 150, the communication interface 160, or the input control module 170) through, for example, the bus 110, interpret the received command, and perform operation or data processing according to the interpreted command.

The memory 130 may store commands or data received from or generated by the processor 120 or the other components (for example, the input/output interface 140, the display unit 150, the communication interface 160, or the input control module 170). The memory 130 may include programming modules, such as, for example, a kernel 131, middleware 132, an application programming interface (API) 133, or one or more applications 134. The programming modules may be configured with software, firmware, hardware, or a combination of two or more of software, firmware, and hardware.

The kernel 131 may control or manage system resources (for example, the bus 110, the processor 120, or the memory 130) that are used to execute operations or functions implemented on the other programming modules, for example, the middleware 132, the API 133, or the applications 134. Also, the kernel 131 may provide an interface to enable the middleware 132, the API 133, or the applications 134 to access the individual components of the electronic device 101 and to control or manage the components.

The middleware 132 may enable the API 133 or the applications 134 to communicate with the kernel 131 so as to receive/transmit data from/to the kernel 131. Also, the middleware 132 may control (for example, scheduling or load balancing) task requests received from the applications 134 using, for example, a method of assigning priority for use of a system resource (for example, the bus 110, the processor 120, or the memory 130) of the electronic device 101 to at least one application of the applications 134.

The API 133 may be an interface to enable the applications 134 to control functions provided by the kernel 131 or the middleware 132. For example, the API 133 may include at least one interface or function (for example, a command) for file control, window control, image processing, or text control.

According to various embodiments, the applications 134 may include a Short Message Service (SMS)/Multimedia Messaging Service (MMS) application, an E-mail application, a calendar application, an alarm application, a health care application (for example, an application for measuring the quantity of exercising, blood sugar, etc.), or an environmental information application (for example, an application for providing information about atmospheric pressure, a humidity, or a temperature, etc.). Additionally or alternatively, the applications 134 may be an application related to information exchange between the electronic device 101 and an external electronic device (for example, an electronic device 104 or a server 106). The application related to information exchange may include, for example, a notification relay application to relay specific information to the external electronic device, or a device management application to manage the external electronic device.

For example, the notification relay application may include a function of relaying notification information generated by another application (for example, a SMS/MMS application, an E-mail application, a health care application, or an environmental information application) of the electronic device 101 to an external electronic device (for example, the electronic device 104 or the server 106. Additionally or alternatively, the notification relay application may receive notification information from, for example, an external electronic device (for example, the electronic device or the server 106), and provide the received notification information to a user. The device management application may turn on/off functions of an external electronic device (for example, the electronic device 104 or the server 106) that communicates with the electronic device 101, or functions of at least one component of the external electronic device, adjust the brightness (or, resolution) of a display, or manage (for example, install, delete, or update) an application that is executed on the external electronic device or a service (for example, a call service or a message service) that is provided by the external electronic device.

According to various embodiments, the applications 134 may include an application designated according to an attribute (for example, the kind of electronic device) of the external electronic device (for example, the electronic device 104 or the server 106). For example, if the external electronic device is a MP3 player, the applications 134 may include an application for playing music. Likewise, if the external electronic device is mobile medical equipment, the applications 134 may include an application related to health-care. According to an embodiment, the applications 134 may include at least one of an application designated by the electronic device 101 and an application received from an external electronic device (for example, the server 106 or the electronic device 104).

The input/output interface 140 may transfer a command or data received from a user through an input/output device (for example, a sensor, a keyboard, or a display unit) to the processor 120, the memory 130, the communication interface 160, or the application executing module 170, for example, through the bus 110. For example, the input/output interface 140 may provide data about a user's touch input received through a display unit to the processor 120. Also, the input/output interface 140 may output a command or data received from the processor 120, the memory 130, the communication interface 160, or the application executing module 170, for example, via the bus 110, through an input/output device (for example, a speaker or a display). For example, the input/output interface 140 may output voice data processed by the processor 120, through a speaker, for a user.

The display unit 150 may display various information (for example, multimedia data or text data) for a user. According to some embodiments, the display unit 150 may include, for example, a plurality of display units. According to an embodiment, the plurality of display units may be set to enable relative changes in position. According to an embodiment, at least one of the plurality of display units may include, for example, a keypad area for receiving a keypad input.

According to an embodiment, the display unit 150 may display a virtual keypad through the keypad area. The virtual keypad may include keys that represent various languages or symbol sets (for example, alphabets, Hangul characters, or Hiragana characters). For example, information input through the keypad area may be converted into values (for example, American Standard Cord for Information Interchange (ASCII)) matching a predetermined language or symbol set (for example, alphabets, Hangul characters, or Hiragana characters), and then recognized by the electronic device 101. According to an embodiment, the keypad area may detect a touch input or a hovering input through a body part (for example, a finger), as well as an electronic pen.

According to an embodiment, the display unit 150 may acquire at least one gesture as a user input from a user. The gesture may include, for example, an operation of directly touching (for example, contacting) at least one area of the display unit 150 using a body part (for example, a finger) or an external input device (for example, an electronic pen), operation of hovering over the display unit 150, or operation of taking a predetermined motion over the display unit 150.

The communication interface 160 may allow communications between the electronic device 101 and an external device (for example, the electronic device 104 or the server 106). For example, the communication interface 160 may connect to a network 162 through wireless/wired communication to communicate with the external device. The wireless communication may include at least one of, for example, Wireless Fidelity (Wi-Fi), Bluetooth (BT), Near Field Communication (NFC), Global Positioning System (GPS), or cellular communication (for example, Long-Term Evolution (LTE), Long-Term Evolution-Advanced (LTE-A), Code Division Multiple Access (CDMA), Wideband Code Division Multiple Access (WCDMA), Universal Mobile Telephone System (UMTS), Wireless Broadband Internet (WiBro), or Global System for Mobile Communications (GSM)). The wired communication may include at least one of, for example, Universal Serial Bus (USB), High Definition Multimedia Interface (HDMI), Recommended Standard 232 (RS-232), or Plain Old Telephone Service (POTS).

According to an embodiment, the network 162 may be a telecommunication network. The telecommunication network may include at least one of a computer network, Internet, Internet of Thing (IoT), or a telephone network. According to an embodiment, a protocol (for example, a transport layer protocol, a data link layer protocol, or a physical layer protocol) for communications between the electronic device 101 and an external device may be supported by at least one of the applications 134, the application programming interface 133, the middleware 132, the kernel 131, or the communication interface 160.

According to an embodiment, the server 106 may perform at least one of operations (or functions) that are implemented on the electronic device 101, thereby supporting driving of the electronic device 101. For example, the server 106 may include an input control server module 108 that can support the input control module 170 implemented on the electronic device 101. For example, the input control server module 108 may include at least one component of the input control module 170 to perform (for example, execute) at least one of operations that are performed by the input control module 170.

The input control module 170 may process at least one part of information acquired from the other components (for example, the processor 120, the memory 130, the input/output interface 140, or the communication interface 160, or the display unit 150), and allow a user to control various functions of the other components (for example, the applications 134, the communication interface 160, etc.). For example, the input control module 170 may perform at least one function of the electronic device 101 corresponding to a gesture acquired through the input area of the display unit 150, based on various variables (for example, a time period, a size, a direction, or intensity of the gesture, sensed through the input area) corresponding to the acquired gesture. Hereinafter, the input control module 170 will be additionally described with reference to FIG. 1B.

Figure 1B:
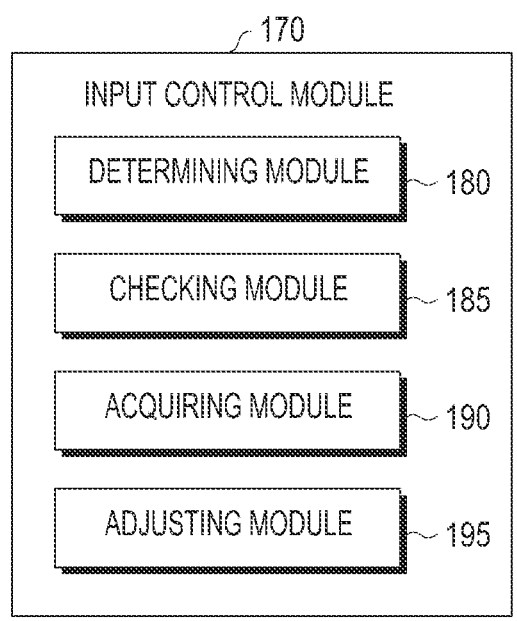
FIG. 1B is a block diagram of an input control module according to various embodiments of the present disclosure.

FIG. 1B is a block diagram of the input control module 170 according to various embodiments of the present disclosure. Referring to FIG. 1B, the input control module 170 may include a determining module 180, a checking module 185, an acquiring module 190, and an adjusting module 195.

The determining module 180 may determine an area (hereinafter, for convenience of description, referred to as an "input area") of the display unit, corresponding to a gesture (hereinafter, for convenience of description, referred to as an "input gesture") acquired through a display unit (for example, the display unit 150) functionally connected to an electronic device (for example, the electronic device 101). The input area may be at least one area of the display unit to acquire a gesture (hereinafter, for convenience of description, referred to as a "control gesture") for controlling a function of the electronic device, for example, based on the input gesture. For example, if a contact is made on or hovering occurs over a first area of the display unit through the input gesture, the determining module 180 may determine a second area including at least one part of the first area, as the input area. For example, the second area may include the first area, and have a size that is the same as or larger than that of the first area. As another example, the second area may include a part of the first area, and have a size that is smaller than that of the first area.

According to an embodiment, the determining module 180 may determine, when the input gesture is maintained for a predetermined time period (for example, about 0.1 seconds), the input area based on the input gesture. For example, if at least one area (for example, the first area determined by directly touching or hovering over the display unit) of the display unit determined by the input gesture is maintained for about two seconds or more, the determining module 180 may determine the input area including the at least one area (for example, the first area) of the display unit. According to another embodiment, if at least one area (for example, the first area determined by directly touching or hovering over the display unit) of the display unit determined by the input gesture is maintained with a predetermined size or at predetermined intensity or more for a predetermined time period, the determining module 180 may determine the input area including the at least one area (for example, the first area) of the display unit.

The checking module 185 may check a control gesture, for example, through at least one part of the input area. The control gesture may be, when a user touches an area of the display unit with his/her finger in order to acquire an input gesture, a user input that is acquired by rolling the finger within the input area without taking the finger off the display unit. For example, the control gesture may include gestures of rolling a finger touching the display unit in a up/down/left/right direction, of taking a part of the finger off the display unit to touch the display unit with only the tip of the finger, or of rotating the finger without taking the finger off the display unit, in order to acquire an input gesture.

The acquiring module 190 may determine various variables (for example, a size, a direction, intensity, or a time period) about at least one gesture (for example, an input gesture or a control gesture). For example, the acquiring module 190 may determine a direction in which the input gesture or the control gesture is located with respect to the display unit. For example, when a user's finger touches the display unit vertically from the lower side area in order to acquire an input gesture (or a control gesture), the acquiring module 190 may determine a direction of an input gesture (or, a control gesture) as a vertical direction.

According to an embodiment, the acquiring module 190 may acquire information about at least one of a time period for which the control gesture is sensed, a size of an area in which the control gesture is sensed, intensity at which the control gesture is sensed, or a direction in which the input gesture moves to the control gesture, from at least one part of the input area. For example, if the control gesture is sensed by a user's movement (or, movement of an electronic pen) while the input gesture touches or hovers over the display unit in the input area, the acquiring module 190 may determine a touched or hovering area of the display unit by the control gesture. Also, the acquiring module 190 may acquire information about a time period for which the control gesture is maintained, from at least one part of the input area. For example, if an area of the display unit is touched by the touch gesture, the acquiring module 190 may determine a time period for which at least one part (for example, an area occupying about 90% of the touched area) of the touched area is maintained.

According to an embodiment, the acquiring module 190 may determine intensity of an input (for example, a force or pressure) for the control gesture. Also, the acquiring module 190 may determine a direction in which the input gesture moves to the control gesture, based on a change in location between an area corresponding to the input gesture and an area corresponding to the control gesture. According to another embodiment, the acquiring module 190 may determine a movement direction to the control gesture, based on a finger's direction for the input gesture and a finger's direction for the control gesture.

According to an embodiment, the display unit may include a plurality of touch sensors (for example, capacitance nodes, pen sensors, or pressure sensors). The acquiring module 190 may determine a gesture (for example, the input gesture or the control gesture) that is input through the display unit (for example, by touching the display unit with a user's finger or an electronic pen or by hovering over the display unit) and sensed through the plurality of touch sensors. For example, if pressure sensors capable of sensing pressure are included in the electronic device (for example, the display unit), the acquiring module 190 may acquire information about the intensity of pressure that is applied to the display unit by a gesture (for example, the input gesture or the control gesture).

According to an embodiment, if the electronic device (for example, the display unit) includes fingerprint sensors, the determining module 180 may determine an area of a gesture (for example, the input gesture or the control gesture), based on a fingerprint pattern or a fingerprint distribution state. For example, the acquiring module 190 may determine intensity of a force at which a user presses the display unit or a finger's contact state, based on a size or shape (for example, a dot, a line, a circle, or a polygon) of a fingerprint pattern recognized through the display unit. For example, if a shape of a fingerprint acquired through the fingerprint sensor is a circle that is smaller than predetermined criteria, the acquiring module 190 may determine that a user made his/her finger stand erect to contact the display unit with only the tip of the finger, or that a user touched the display unit lightly such that at least one part of the finger slightly contacts the display unit.

For example, if a fingerprint is recognized in the form of a bar that is smaller than the predetermined criteria, the acquiring module 190 may determine that a finger's side contacted the display unit. According to an embodiment, the acquiring module 190 may compare a first fingerprint pattern (for example, a fingerprint pattern for the input gesture) that has been previously (for example, first) sensed, to a second fingerprint pattern (for example, a fingerprint pattern for the control gesture) that has been sensed after a predetermined time period (for example, about two seconds for which at least one part (about 80%) of the previously sensed fingerprint pattern is maintained) has elapsed.

According to an embodiment, the acquiring module 190 may determine a change in relative location between the input gesture and the control gesture, based on the results of the comparison between the first fingerprint pattern and the second fingerprint pattern. Also, according to an embodiment, the acquiring module 190 may determine (for example, estimate) a direction in which the input gesture moves to the control gesture, based on the change in relative location.

According to an embodiment, the fingerprint sensors for recognizing a fingerprint pattern may be included in or located around a button formed in a part of an electronic device (for example, the electronic device 101). A fingerprint may be recognized by using a display unit with an embedded optical sensor, other than using the fingerprint sensors. The optical sensor, which may be an infrared sensor, may be installed in the display unit (for example, a touch panel) or in each pixel included in the display unit. According to an embodiment, the optical sensor may detect changes in light when a user touches the display unit to thus recognize a fingerprint pattern.

According to an embodiment, information about a user's fingerprint may be stored in a server (for example, the server 106) or an electronic device (for example, the electronic device 104) that can connect to the server. The acquiring module 190 may compare fingerprint information (hereinafter, for convenience of description, referred to as "acquired fingerprint information") acquired through the display unit to fingerprint information (hereinafter, for convenience of description, referred to as "stored fingerprint information") stored in the server to thus authorize a user corresponding to the acquired fingerprint information to use the electronic device (for example, the electronic device 101). For example, if the acquired fingerprint information is identical to the stored fingerprint information, the acquiring module 190 may allow the user to access the electronic device. For example, if acquired fingerprint information is identical to stored fingerprint information about criminals stored in the server, the acquiring module 190 may disallow the user to access the electronic device.

According to an embodiment, the acquiring module 190 may compare acquired fingerprint information to stored fingerprint information stored in the server to determine which finger of the user the acquired fingerprint information matches. Also, the acquiring module 190 may acquire information about a direction in which the determined finger is positioned with respect to the electronic device, according to the determined finger of the user. Also, the acquiring module 190 may determine a change in location and a change in size according to a finger's movement. According to an embodiment, the fingerprint information may be determined or stored using text, an image, or a symbol.

According to an embodiment, the acquiring module 190 may determine a center point, a movement direction, a direction of action, or intensity of a user input (for example, an input gesture or a control gesture), based on a distribution of nodes (for example, capacitance nodes of the display unit) that sensed the user input. According to an embodiment, if at least one part of an input area set based on a user's input gesture includes an area corresponding to a control gesture, the acquiring module 190 may determine maintenance time periods of areas in which input values (for example, values of capacitance nodes) acquired through the display unit in response to the control gesture change within a predetermined error range.

According to an embodiment, the acquiring module 190 may compare a distribution area of touch sensors (for example, capacitance nodes) that sensed the control gesture, to a distribution area of touch sensors that sensed the input gesture, to thus determine a direction in which the input gesture moves to the control gesture. According to an embodiment, the acquiring module 190 may determine changes in intensity of pressure that is applied to the display unit by the input gesture or the control gesture. For example, if the intensity of pressure sensed by the control gesture is greater than the intensity of pressure sensed by the input gesture, the acquiring module 190 may determine that a user has increased a force that is applied to the display unit after inputting an input gesture, in order to input a control gesture.

The adjusting module 195 may adjust at least one function of the electronic device (for example, the electronic device 101), according to at least one of a time period for which the control gesture is sensed, a size of an area in which the control gesture is sensed, intensity at which the control gesture is sensed, or a direction in which the input gesture moves to the control gesture, in at least one part of the input area. According to an embodiment, the adjusting module 195 may adjust a degree of at least one function of the electronic device, according to the time period, the size of the area, the movement direction, or the intensity sensed in the at least one part of the input area. For example, if the time period, the size of the area, the movement direction, or the intensity is a first time period, a first size, a first movement direction, or first intensity, the adjusting module 195 may adjust the function to a first degree (for example, a level, a length, a size, an angle, a direction, strength of vibration, volume, a chroma level, transparency, a relative location, speed, or a driving time). For example, if the time period, the size of the area, the movement direction, or the intensity is a second time period, a second size, a second movement direction, or second intensity, the adjusting module 195 may adjust the function to a second degree.

According to an embodiment, the adjusting module 195 may display a cursor in at least one area (for example, the center area) of the display unit in correspondence to the input gesture. For example, if it is determined that a user's gesture is an input gesture for controlling a function of the electronic device, the adjusting module 195 may display a cursor as a user interface for the input gesture. The cursor may include, for example, an icon, text, an image, various figures, or various symbols. Also, the cursor may be displayed, for example, transparently, translucently, or opaquely.

According to an embodiment, the adjusting module 195 may move the cursor displayed in response to the input gesture, in a movement direction of the control gesture. For example, if the movement direction of the control gesture is a first movement direction (for example, to the left of the display unit), the adjusting module 195 may move the cursor in the first direction (for example, to the left of the display unit) of the display unit, and if the movement direction of the control gesture is a second movement direction (for example, to the right of the display unit), the adjusting module 195 may move the cursor in the second direction (for example, to the right of the display unit) of the display unit. According to an embodiment, if the control gesture is a gesture of rotating clockwise or counterclockwise with respect to the input gesture, the adjusting module 195 may rotate the cursor, for example, clockwise or counterclockwise.

According to an embodiment, the adjusting module 195 may determine whether there is text (for example, E-mail, a text message, content of a web page, Ebook, etc.) displayed on the display unit. For example, if the adjusting module 195 determines that there is text displayed on the display unit, the adjusting module 195 may select at least one of a word, a sentence, or a paragraph in the text, based on the control gesture. For example, if a web page is displayed on the display unit of the electronic device, the adjusting module 195 may determine whether there is text in an area of the display unit selected (for example, touched) by a user. Also, if the control gesture is a gesture of moving the input gesture by a first degree, the adjusting module 195 may select a word from the text. Also, if the control gesture is a gesture of moving the input gesture by a second degree, the adjusting module 195 may select a sentence from the text. For example, the adjusting module 195 may select at least one of a word, a sentence, or a paragraph as a selection range of text, based on the control gesture (for example, a drag gesture or a double-touch gesture).

According to an embodiment, the adjusting module 195 may zoom in/out content (for example, a map, a picture, or a web page) of an application, based on a time period for which the control gesture is sensed. For example, if a control gesture is sensed for a predetermined time period (for example, about 0.1 seconds) or more when the electronic device executes a navigation application, the adjusting module 195 may zoom in/out a map of the navigation application at a predetermined magnification according to a time length that has elapsed from the predetermined time period. For example, if a first time length has elapsed from the predetermined time period, the adjusting module 195 may zoom in/out the map at a first magnification, and if a second time length has elapsed from the predetermined time period, the adjusting module 195 may zoom in/out the map at a second magnification.

According to an embodiment, the adjusting module 195 may control an application being executed on the electronic device (for example, the electronic device 101), in various ways, based on at least one of a maintenance time period, a size of an area, or a movement direction of the control gesture. For example, the adjusting module 195 may move a menu or content (for example, a figure, a map, video, or a web page) of the application, based on the movement direction of the control gesture. For example, if the movement direction of the control gesture is a first movement direction, the adjusting module 195 may move a menu or content of the application in a first direction. Also, if the movement direction of the control gesture is a second movement direction, the adjusting module 195 may move a menu or content of the application in a second direction.

According to an embodiment, the adjusting module 195 may display, as a user interface, a sub area (for example, a translucent, rectangular area which is the input area) for acquiring a control gesture in at least one area (for example, the lower, left, or right area of the display unit) of the electronic device. For example, if an input area is determined based on an input gesture, the adjusting module 195 may display visual information representing the input area in at least one area of the display unit. According to an embodiment, the adjusting module 195 may display the input area as a translucent, rectangular area, and zoom in/out an application being displayed on the display unit in correspondence to the size of the input area.

According to an embodiment, if the display unit includes one or more sub areas, the adjusting module 195 may perform different functions of the electronic device based on the locations of the sub areas. For example, the display unit of the electronic device may include a first sub area and a second sub area. For example, if the control gesture is acquired from the first sub area, the adjusting module 195 may perform a first function, and if the control gesture is acquired from the second sub area, the adjusting module 195 may perform a second function. For example, if the first sub area is positioned at the upper area of the display unit, and the second sub area is positioned at the left area of the display unit, the adjusting module 195 may zoom in/out a picture based on a control gesture acquired from the first sub area. For example, the adjusting module 195 may move content based on a control gesture acquired from the second sub area.

According to an embodiment, the adjusting module 195 may adjust functions of the electronic device based on a direction of a user's line of sight. For example, the adjusting module 195 may determine a direction of a user's line of sight with respect to the electronic device, based on an input gesture or a control gesture. Also, if the direction of the user's line of sight is a first direction of a line of sight, the adjusting module 195 may control the display unit to display an object in a first direction. Also, if the direction of the user's line of sight is a second direction of a line of sight, the adjusting module 195 may control the display unit to display an object in a second direction. For example, if a user is determined to be located to the left of the electronic device based on the input gesture or the control gesture, the adjusting module 195 may output an object that is output to the right of the display unit, to the left of the display unit. For example, the adjusting module 195 may change an output direction of an object based on a direction of a user's line of sight so that the user can see the object in an exact direction.

According to an embodiment, the adjusting module 195 may determine a change in intensity of a force corresponding to a control gesture, based on the maintenance time period, the size of the area, the movement direction, or the intensity in at least one part of the input area. For example, if the size of the area increases, the adjusting module 195 may determine that a force that is applied to the display unit by the control gesture increases. For example, an area of the display unit that sensed a user's gesture when the user touches the display unit with a greater force may be larger than an area of the display unit that sensed the user's gesture when the user touches the display unit with a smaller force.

According to an embodiment, the adjusting module 195 may adjust speed at which the functions of applications of the electronic device are controlled, based on at least one of the maintenance time period, the size of the area, the movement direction, or the intensity. For example, as a user presses the display unit with a greater force (for example, as a user presses the display unit over a wider area), the adjusting module 195 may control the functions of the applications at higher speed. For example, the adjusting module 195 may increase/decrease speed at which menus of applications move or at which pictures are zoomed in/out, based on at least one of the maintenance time period, the size of the area, the movement direction, or the intensity.

According to an embodiment, if a control gesture corresponds to the input gesture, the adjusting module 195 may stop adjusting functions of the electronic device or applications, or restore adjusted functions of the electronic device or applications to previous states before the functions have been adjusted. For example, the control gesture may return to an area corresponding to the input gesture, according to the user's control operation (for example, a movement or a gesture). For example, if a user touches the display unit with his/her finger (for example, an input gesture), and then moves the finger from left to right (for example, a control gesture), a picture may be zoomed in. At this time, if the user adjusts the control gesture to move to an area of the display unit that sensed the touch operation, the adjusting module 195 may change the size of the picture to the previous size of the picture before the picture is zoomed in, or stop zooming in the picture.

According to an embodiment, the adjusting module 195 may control scroll speed, page turning speed, or zoom in/out speed of applications, based on a time period for which a control gesture is maintained. For example, if a user continues to press the display unit in a predetermined direction, the adjusting module 195 may increase scroll speed of a web page, based on a time period for which the pressing operation is sensed.

According to an embodiment, the adjusting module 195 may control the electronic device or applications, based on a movement direction of at least one of an input gesture or a control gesture. For example, the adjusting module 195 may rotate content of an application in at least one direction of a clockwise direction and a counterclockwise direction. Also, the adjusting module 195 may adjust the volume (for example, sound) of the electronic device or applications. For example, if a user rotates his/her finger touching the display unit in the clockwise direction without taking the finger off the display unit, the adjusting module 195 may turn up/down the volume of an application based on the clockwise direction.

Figure 2A:
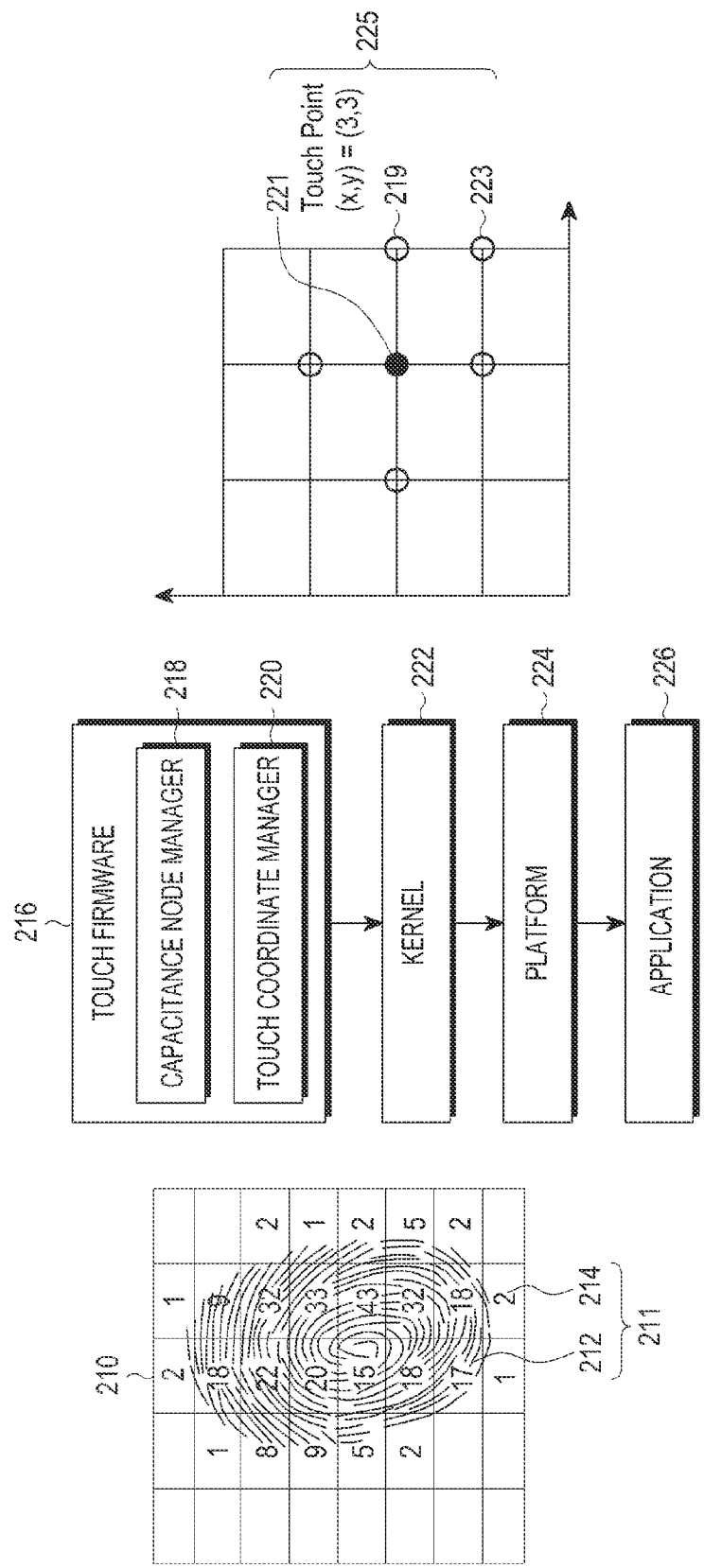
FIG. 2A is a view for describing an example of a method in which an electronic device according to various embodiments of the present disclosure acquires a user input, and shows a block diagram of the electronic device.

FIG. 2A is a view for describing an example of a method in which an electronic device (for example, the electronic device 101) according to various embodiments of the present disclosure acquires a user's input (for example, an input gesture or a control gesture), and shows a block diagram of the electronic device. Referring to FIG. 2A, the electronic device (for example, the electronic device 101) may include, for example, touch firmware 216, a kernel 222, a platform 224, and an application 226.

The touch firmware 216 may acquire coordinates of an area determined by touching or hovering over a display unit 210 (for example, a touch panel), based on values (for example, displacement values of charge quantity) of one or more nodes (for example, capacitance nodes) 211 included in the display unit 210. According to an embodiment, the touch firmware 216 may include a capacitance node manager 218 and a touch coordinate manager 220. The capacitance node manager 218 may determine capacitance node values of at least part of the nodes 211.

According to an embodiment, the electronic device 210 may detect a user input (for example, a touch input or a hovering input) in various ways. For example, in order to detect a user input, the display unit 210 may use one of various methods including a capacitive method of using static electricity from human bodies, a resistive method of sensing pressure, and an infrared sensor method. According to an embodiment, in the case of the capacitive method, the capacitance node manager 218 may sense a user input (for example, an input gesture or a control gesture) through a capacitance display unit (for example, the display unit 210) including a plurality of capacitance nodes 211. For example, if a user touches the display unit 210, the capacitance node manager 218 may detect the user's input, based on charge quantities of the capacitance nodes 211 changing depending on static electricity from the user.

According to an embodiment, values of charge quantities of one or more nodes 211 of the display unit 210, which have detected a user input, may be different from each other according to the user input. For example, a value (for example, "17") of a charge quantity of a first node 212 that the user's finger contacts over a relatively wider area may be greater than a value (for example, "2") of a charge quantity of a second node 214 that the user's finger contacts over a relatively narrower area. The first node 212 may be a node corresponding to the user's finger, and the second node 214 may be a node corresponding to the boundary of the user's finger.

The touch coordinate manager 220 may determine coordinates of an area determined by touching (or hovering over) the display unit 210, based on values of charge quantities of one or more nodes 211. According to a method of determining coordinates of a touched area, the electronic device (for example, the touch coordinate manager 220) may acquire, as touch points, coordinates of a plurality of nodes that have detected a touch input made on the display unit 210. For example, the electronic device may remove unnecessary values (for example, noise values) from values of a plurality of nodes, based on predetermined criteria (for example, a touch point determination algorithm). According to an embodiment, the touch coordinate manager 220 may determine coordinates of at least one node, among coordinates 225 (for example, 219, 221, and 223) of nodes that have detected a user's input, as a touch point 221, based on the touch point determination algorithm.

According to an embodiment, the electronic device may transfer the touch point 221 to the application 226 through the kernel 222 and the platform 224. For example, the application 226 may locate or move the user's input based on the touch point 221.

Figure 2B:
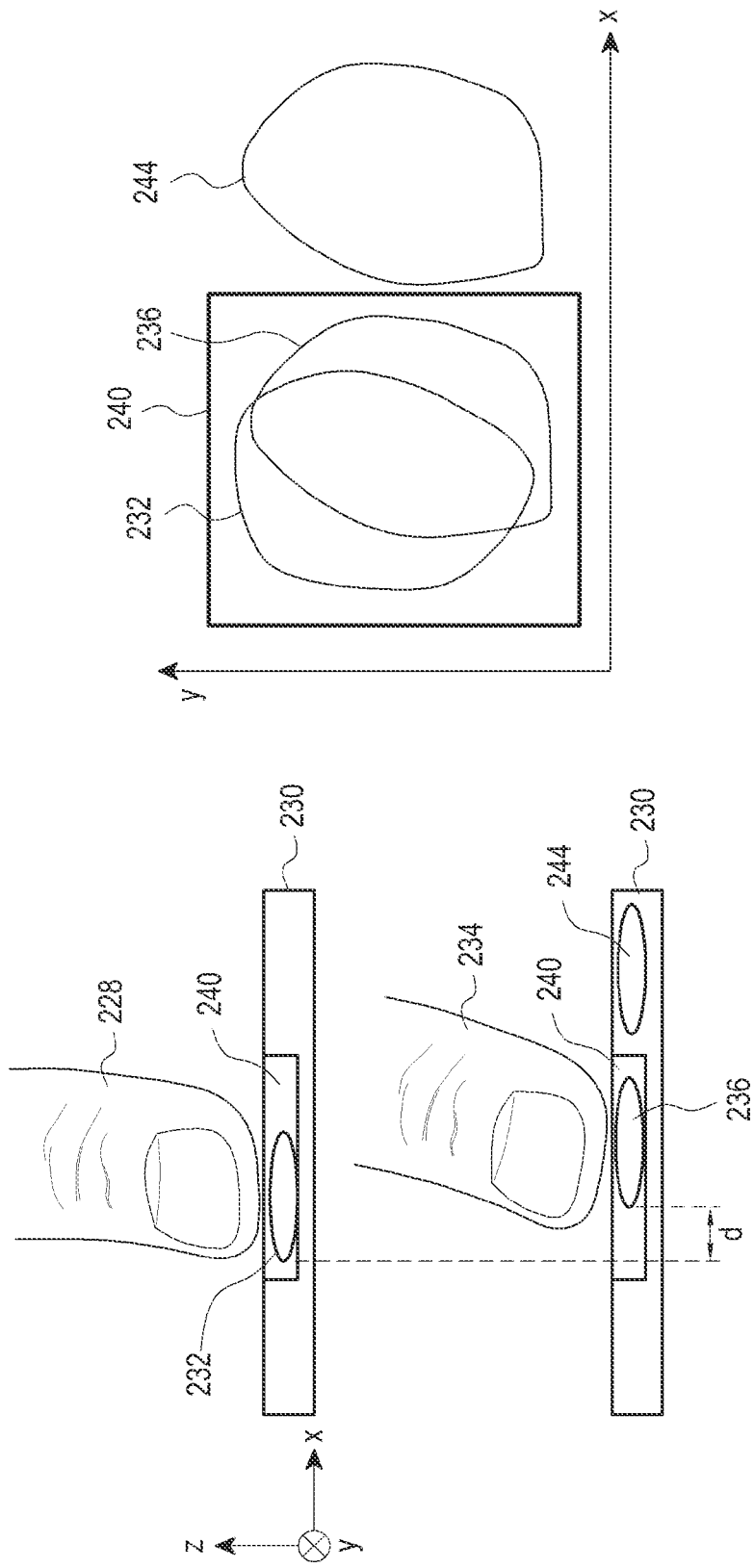
FIG. 2B is a view for describing an example of a method in which an electronic device according to various embodiments of the present disclosure sets an input area based on a user input.

FIG. 2B is a view for describing an example of a method in which an electronic device (for example, the determining module 180) according to various embodiments of the present disclosure sets an input area based on a user input. Referring to FIG. 2B, the electronic device (for example, the determining module 180) may detect a user's gesture (for example, operation of touching or hovering over a display unit 230 with a user's body part or an electronic pen) through the display unit 230. For example, if a user's finger touches (or hovers over) the display unit 230, the electronic device may determine the touch operation as an input gesture 228. Also, the electronic device may determine a first area 232 corresponding to the input gesture 228 through nodes (for example, capacitance nodes or pressure sensing nodes) of the display unit 230, which have detected the input gesture 228.

The first area 232 may be determined according to a distribution of nodes (for example, pressure sensing nodes, charge quantity measuring nodes, or electronic pen sensing nodes) that respond to the input gesture 228 input through the display unit 230. According to an embodiment, if the display unit 230 of the electronic device includes a fingerprint recognition sensor, the electronic device may detect the first area 232 based on an area onto which a fingerprint pattern is input. According to an embodiment, if the electronic device includes a display unit 230 with a force sensor, the electronic device may detect pressure that is applied onto the display unit 130 to determine the first area 232.

According to an embodiment, the electronic device (for example, the determining module 180) may set an input area 240 based on the first area 232. For example, if the input gesture 228 is maintained for a predetermined time period (for example, about 0.1 seconds) so that at least one part of the first area 232 corresponding to the input gesture 228 is maintained, the electronic device may set the input area 240 based on the first area 232. The input area 240 may include at least one part of the first area 232.

According to an embodiment, the input area 240 may have a side that is longer than a length of at least one of an x-axis direction length and a y-axis direction length of the first area 232. For example, the x-axis direction length of the input area 240 may be longer than the x-axis direction length of the first area 232. Or, the y-axis direction length of the input area 240 may be longer than the y-axis direction length of the first area 232. According to an embodiment, the input area 240 may have a rectangular shape including at least one part of the first area 232. According to various embodiments, the input area 240 may have one of various shapes, such as a circle, an oval, or a triangle.

According to an embodiment, the electronic device (for example, the checking module 185 of FIG. 1B) may detect a gesture (for example, a control gesture) 234 according to the user's additional input, from at least one part of the input area 240. For example, if a user's operation of touching the first area 232 on the surface of the display unit 230 is detected as the input gesture 228, the control gesture 234 may include an additional movement of rolling the user's finger in a up/down/left/right direction on the display unit 230, making the user's finger stand erect, or laying the user's finger down, or rotating the user's finger, after taking the input gesture 228, without taking the user's finger off the display unit 230.

For example, after a user touches the surface of the display unit 230 with his/her finger (for example, operation of acquiring the input gesture 228), the user may roll the finger to the left (for example, the x-axis direction) of the display unit 230 (for example, operation of acquiring the control gesture 234). According to an embodiment, by taking the control gesture 234 of rolling the finger to the left of the display unit 230 from the input gesture 228, a contact area of the finger to the display unit 230 may change from the first area 232 to the second area 236. For example, the second area 236 corresponding to the control gesture 234 may include an area moved by a predetermined distance d from the first area 234.

According to an embodiment, at least one part of the second area 236 corresponding to the control gesture 234 may be included in the input area 240. According to an embodiment, the electronic device (for example, the adjusting module 195) may adjust at least one function of the electronic device (for example, the electronic device 101), based on at least one of various information (for example, a maintenance time period, a size of an area, a change in direction from the first area 232 to the second area 236, and intensity of the user's input determined based on the second area 236) related to the second area 236 sensed in the input area 240.

According to an embodiment, if a third area 244 corresponding to one or more nodes that have sensed an additional gesture taken after the input gesture 228 is determined to be out of the input area 240, the electronic device may perform operation (for example, operation determined based on a touched area (for example, location values)) according to a general touch input.

Figure 2C:
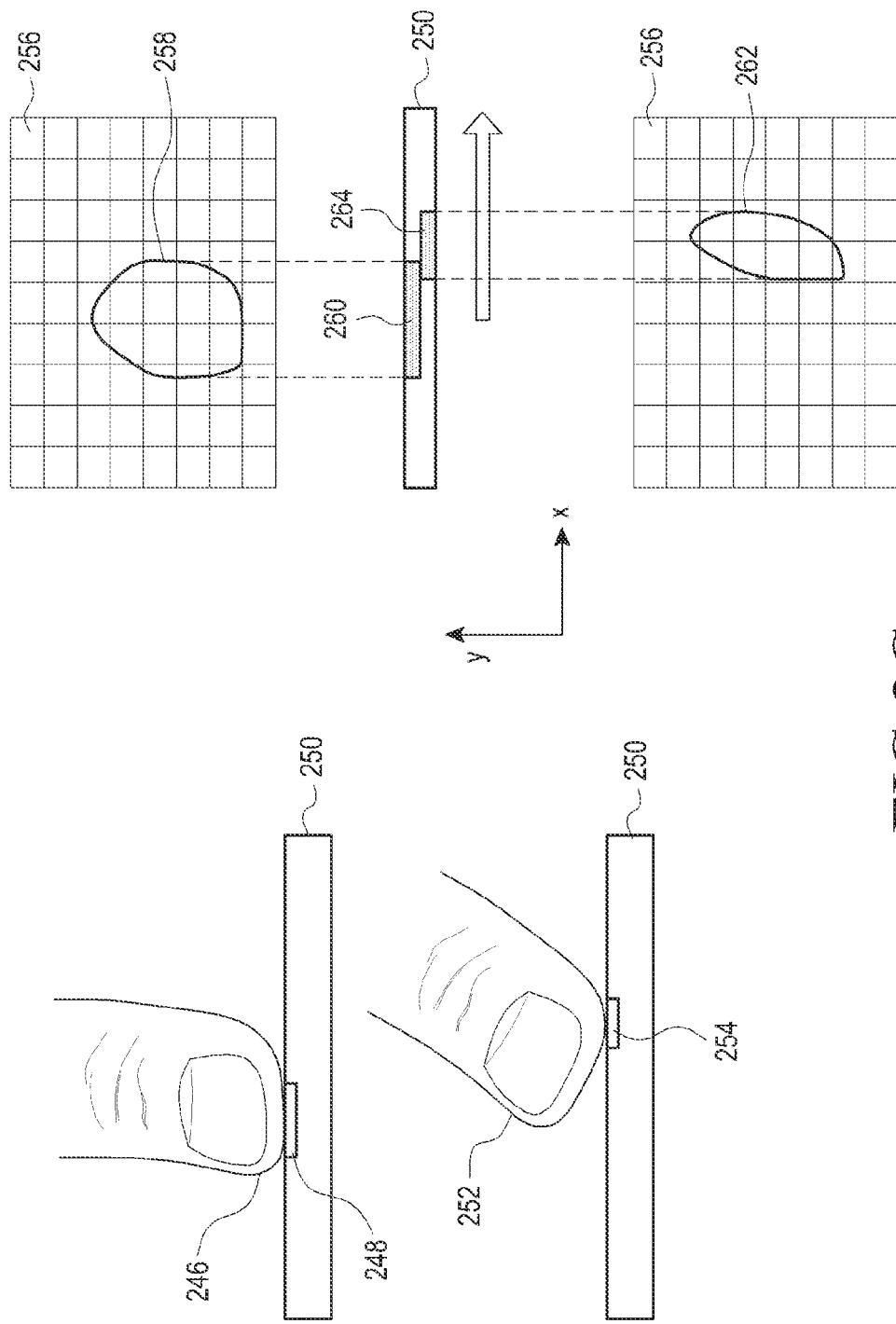
FIG. 2C is a view for describing an example of a method in which an electronic device according to various embodiments of the present disclosure determines a movement direction of a user input based on the user input.

FIG. 2C is a view for describing an example of a method in which an electronic device according to various embodiments of the present disclosure determines a movement direction of a user input based on the user input. According to an embodiment, a user may contact the surface of a touch panel 250 (for example, the display unit 150) with his/her finger, and then, apply a force to a part of the finger. In this case, a center node (for example, a center point) of an area of the touch panel 250 that the finger contacts, or a node (for example, a capacitance node or a pressure sensing node) from which the greatest pressure is sensed may change according to the part of the finger to which the force is applied. For example, a location (for example, coordinates) of the center node or the node from which the greatest pressure is sensed may change according to the part of the finger to which the force is applied.

According to an embodiment, the electronic device (for example, the adjusting module 195) may execute various operations, based on a change in location of the center node (for example, a location (for example, coordinates) of the touch panel 250 at which a center point of a user input is positioned). For example, the electronic device (for example, the determining module 180) may acquire a first gesture 246 (for example, an input gesture of touching the touch panel 250 with a finger), and a second gesture 252 (for example, operation of rolling the finger, making the finger stand erect, raising the finger up, or rotating the finger), without releasing (for example, operation of taking the finger off the touch panel 250) the touch panel 250, successively.

A first area 248 corresponding to the first gesture 246 may include a first node corresponding to a center point of the first gesture 246. A second area 254 corresponding to the second gesture 252 may include a second node corresponding to a center point of the second gesture 252. According to an embodiment, the electronic device (for example, the adjusting module 195) may provide various user interfaces to a user, based on a change (for example, a change from the first node to the second node) of a center node performed by the user. For example, the electronic device (for example, the adjusting module 195) may zoom in/out content being displayed, based on a change of a center node.

According to an embodiment, a shape of a contact area on which the user's finger contacts the touch panel 250 by the first gesture 246 or the second gesture 252, and input values (for example, coordinates of a touched area) corresponding to the contact area may vary. For example, the electronic device may detect the first gesture 246 from the user through the first area 248 of the touch panel 250. If the user inputs the first gesture 246 and then inputs the second gesture 252 (for example, if a user inputs the first gesture 246 and then rolls his/her finger to the left or right), the electronic device may sense the second gesture 252 through a second area 254 of the touch panel 250.

According to an embodiment, the touch panel 250 may include a plurality of touch sensors 256 (for example, capacitance nodes). The first area 248 touched by the first gesture 246 may include (for example, form) a first distribution 258 of a plurality of nodes that have sensed the first gesture 246. The second area 254 touched by the second gesture 252 may form a second distribution 262 of a plurality of nodes that have sensed the second gesture 252. Through the first distribution 258 and the second distribution 262 formed by the first gesture 246 or the second gesture 252, the electronic device may detect a change in shape of a user input (for example, the first gesture 246 or the second gesture 252) input to the touch panel 250.

For example, a finger's (or an electronic pen's) movement generated in order to make an input from the first gesture 246 to the second gesture 252, or a change in direction of a force applied to the touch panel 250 in order to make the input from the first gesture 246 to the second gesture 252 may make a change in shape of a contact area of the touch panel 250 or a change in distribution of nodes that sense an input from the touch panel 250. According to an embodiment, the electronic device may estimate intensity of a user input (for example, the first gesture 246 or the second gesture 252) that is input by the user through the touch panel 250, based on input values input to the individual nodes by the first gesture 246 or the second gesture 252, or the number or distribution of nodes having input values that are equal to or greater than a predetermined value (for example, about 154). For example, the case in which a user presses the touch surface of the touch panel 250 at first intensity with his/her finger and maintains the pressing operation may form a wider contact area and generate greater capacitance values than the case in which the user presses the touch surface of the touch panel 250 at second intensity that is lower than the first intensity.

According to an embodiment, the user may input the first gesture 246 of making his/her finger stand erect and contacting the touch panel 250 with the finger (for example, the case in which the user's finger contacts the touch panel 260 vertically), and then input the second gesture 252 of rolling the finger in the left/right direction. In this case, a second contact area 262 of the touch panel 250 corresponding to the second gesture 252 may be smaller than the first contact area 258 of the touch panel 250 corresponding to the first gesture 246. For example, the width 264 of the second contact area 262 may be narrower than the width 260 of the first contact area 258.

According to an embodiment, the electronic device may acquire information about a direction in which the first gesture 246 moves to the second gesture 252, according to changes in coordinates between the width 260 of the first contact area 258 and the width 264 of the second contact area 262. For example, the electronic device (for example, the acquiring module 190) may compare the width 260 of the first distribution (that is, the first contact area 258) of nodes that have sensed the first gesture 246, to the width 264 of the second distribution (that is, the second contact area 262) of nodes that have sensed the second gesture 252. For example, the second contact area 262 may have one side (for example, the right side) that is longer than one side (for example, the right side) of the first contact area 258 in an x-axis direction, although the width 264 of the second contact area 262 is narrower than the width 260 of the first contact area 258. Accordingly, the electronic device may determine that a contact area of the touch panel 250 which the user's finger contacts has moved from the left of the touch panel 250 to the right of the touch panel 250.

Figure 2D:
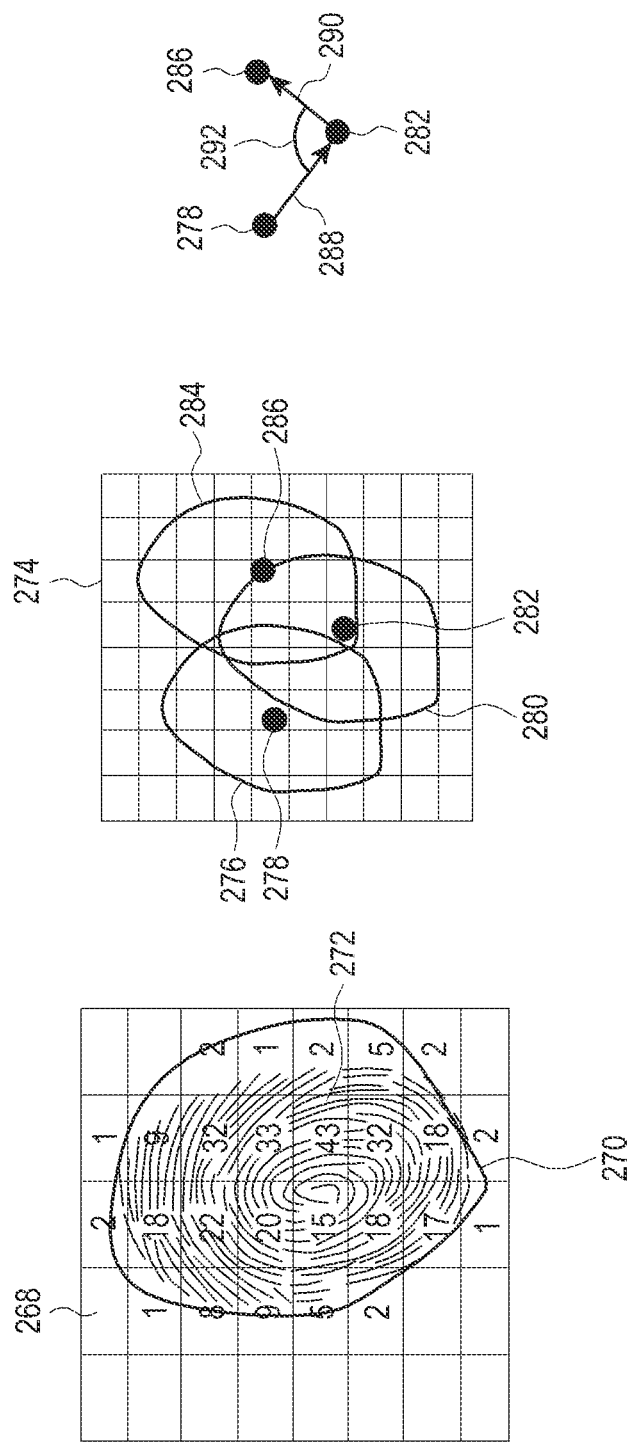
FIG. 2D is a view for describing an example of a method in which an electronic device according to various embodiments of the present disclosure determines a location reference point in a user input based on the user input.

FIG. 2D is a view for describing an example of a method in which an electronic device according to various embodiments of the present disclosure determines a reference point for determining a location of a user input (for example, an input gesture or a control gesture), wherein the reference point may be center coordinates of nodes that have sensed the user input. According to an embodiment, the electronic device (for example, the acquiring module 190) may determine (for example, measure) center points of user inputs (for example, input values acquired from capacitance nodes) input through a touch panel (for example, the touch panel 250) to determine (for example, estimate) movement directions or angles (for example, an angle of a trajectory along which an input moves from its initial location) of the user inputs.

For example, the electronic device may measure a center point of a plurality of nodes 268 included in the touch panel (for example, the display unit 150). According to an embodiment, the electronic device may designate, as a center point, a point corresponding to a center location of a distribution of nodes of a touch sensor (for example, the touch panel) 274 that receives input signals when a user touches or hovers over the touch panel. According to an embodiment, the electronic device may designate, as a center point, coordinates of a node 272 receiving a maximum input value, among one or more nodes 270 of the touch panel, which have sensed a touch input.

According to an embodiment, the electronic device may designate, as a center point, coordinates (for example, coordinates of a node having an input value "150") of a node having the greatest input value in a distribution of nodes of the touch panel that have sensed input values equal to or greater than a predetermined value (for example, "130"). According to an embodiment, the electronic device may determine a first node distribution 276 corresponding to (for example, sensing) a first gesture input by a user through the touch sensor (for example, the touch panel or the display unit) 274, a second node distribution 280 corresponding to (for example, sensing) a second gesture, or a third node distribution 284 corresponding to (for example, sensing) a third gesture. Also, the electronic device may determine a first center point 278 corresponding to the first node distribution 276, a second center point 282 corresponding to the second node distribution 280, and a third center point 286 corresponding to the third node distribution 284.

According to an embodiment, the electronic device may determine the user's movement in correspondence to the first, second, and third center points 278, 282, and 286. For example, the electronic device may determine a first movement 288 from the first gesture to the second gesture, and a second movement 290 from the second gesture to the third gesture. A movement from the first gesture to the third gesture may form a predetermined trajectory (for example, the first movement 288 and the second movement 290).

According to an embodiment, the electronic device may determine a direction, distance, or angle of the user's movement according to a movement trajectory of the center points. For example, the electronic device may determine a movement distance or a movement direction corresponding to the first movement 288, and a movement distance or a movement direction corresponding to the second movement 290. Also, the electronic device may determine an angle 292 between the first movement 288 and the second movement 290.

Figure 3A:
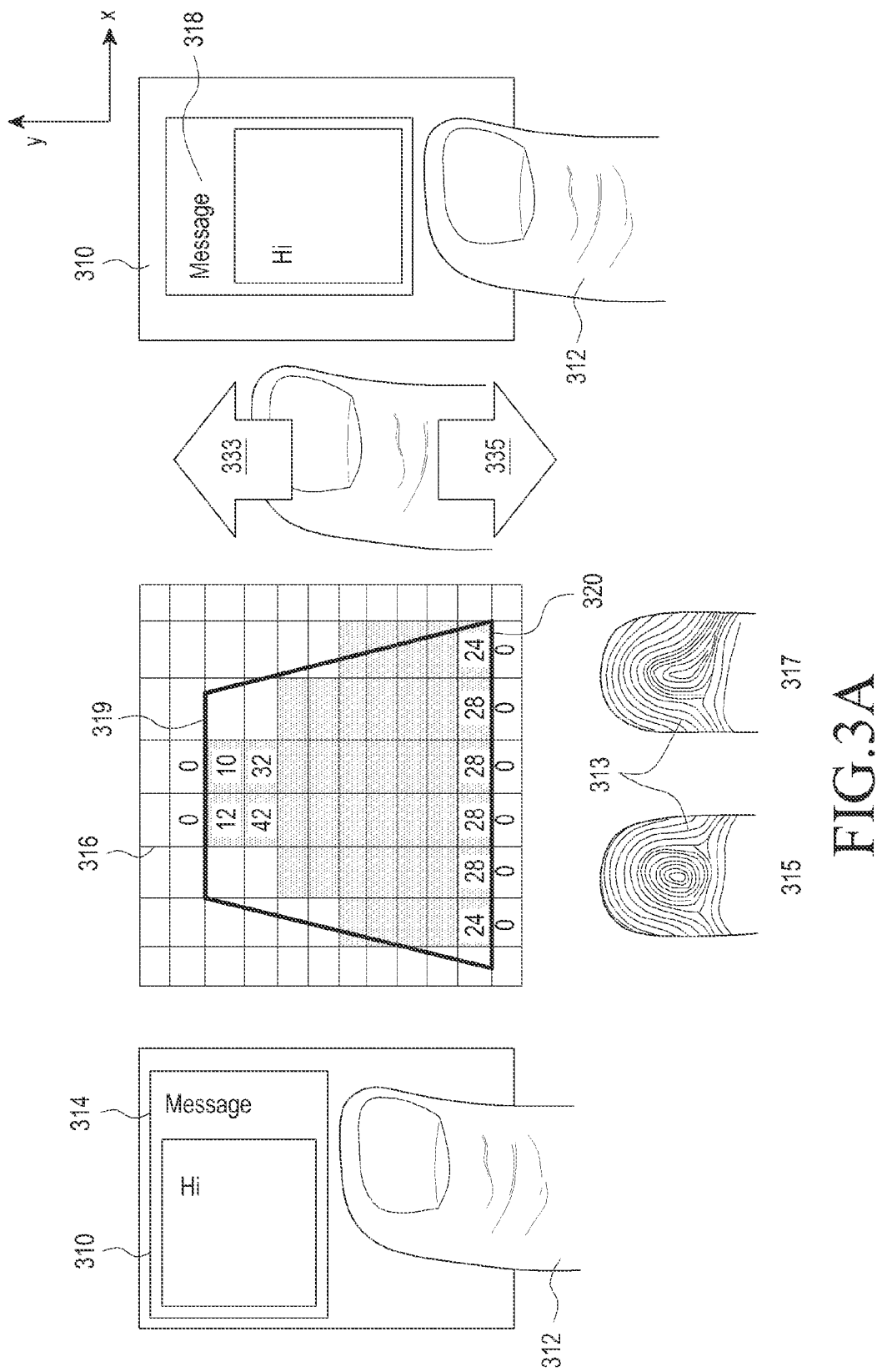
FIG. 3A is a view for describing an example of a method in which an electronic device according to various embodiments of the present disclosure displays an object through a display unit based on a user input.

FIG. 3A is a view for describing an example of a method in which an electronic device according to various embodiments of the present disclosure displays an object through the display unit based on a user input (for example, a direction corresponding to a user's input). Referring to FIG. 3A, if a user's finger 312 touches the electronic device 101, the electronic device 101 may detect an input direction (for example, the up/down/left/right/diagonal direction of the display unit) of the user's finger 312. According to an embodiment, the electronic device may determine directivity of a distribution of nodes (for example, capacitance nodes) that are included in the display unit (for example, the touch panel) and have sensed a user input (for example, a touch input or a hovering input), based on at least one information among the distribution or shape of the nodes or differences between the input values of the nodes and the input values of the adjacent nodes. According to an embodiment, the electronic device may estimate a direction of the user's finger based on the directivity.

For example, a distribution of nodes having relatively greater input values among the input values (displacement values of capacitance) of nodes that have sensed a user input may have a rectangular shape. According to an embodiment, a distribution of nodes may vary depending on a finger's direction. For example, a distribution of node values corresponding to a user input is reduced from a first value (for example, about 42 or 32) being a relatively great value to a second value (for example, about 12 or 10), and then reduced to a non-input value (for example, about 0) corresponding to the case in which no input value is sensed, in a first direction 333 toward a finger tip. Meanwhile, a distribution of node values corresponding to a user input may change sharply from a relatively great value (for example, about 28 or 24) to the non-input value (for example, about 0), in a second direction 335 (for example, a direction that is opposite to the first direction 333 toward the finger tip) toward the user.

According to an embodiment, if a user touches the display unit with his/her finger when the electronic device includes a fingerprint sensor, the electronic device may detect a fingerprint pattern. The electronic device may recognize a tip of the finger and a direction of a joint, based on the fingerprint pattern. For example, if the fingerprint has an arc-shaped pattern or a tented arc-shaped pattern, the electronic device may determine that the convex parts of ridges are toward the tip or tip part of the finger, and the concave parts of the ridges are toward the joint of the finger. If the fingerprint has a whorl pattern 315 or a loop pattern 317, the electronic device may determine that a part in which a delta point 313 exists is closer to the joint of the finger.

According to an embodiment, if a size of a distribution of nodes that have sensed a user input is equal to or smaller than a predetermined size, the electronic device may fail to detect directivity of distribution. For example, if a touched area is narrower than a predetermined size (for example, a size corresponding to 15 nodes that have sensed a touch input), a distribution of input values corresponding to nodes may show a circle shape or an irregular shape. When the electronic device fails to detect directivity of distribution, the electronic device may determine a degree of a distribution of nodes corresponding to a user input that has been input before or within a predetermined time period (for example, about 0.2 seconds). Also, the electronic device may estimate directivity of a distribution of nodes corresponding to a current user input, or a movement angle of the nodes, using the degree of the distribution of the nodes corresponding to the previous user input.

According to an embodiment, the electronic device may estimate a direction of a finger's movement, based on at least one of a changed shape of nodes or differences between the input values of the nodes and the input values of the adjacent nodes. For example, the electronic device may estimate an input direction of the user's finger 312, based on a direction in which the nodes are distributed.

According to an embodiment, if a part of a plurality of nodes 316 included in the display unit are touched by the user's finger 312, a distribution of the touched nodes may be recognized as a predetermined shape according to a shape of the finger 312.

For example, the electronic device 101 may determine a direction of the finger 312 based on a shape of nodes whose touch input values have been sensed. For example, if a shape of nodes whose touch input values have been sensed is a shape in which one side 319 is relatively narrower than the opposite side 320, the electronic device may determine that the side 319 is a tip part (for example, a fingertip to which a nail heads) of the finger 317. Also, the electronic device may determine that the opposite side 320 is a main part of the finger 317. Thereby, the electronic device may estimate a direction of the finger 317 that touches the display unit 310.

According to an embodiment, the electronic device may estimate a location of a user using the electronic device, according to a direction of the user's finger estimated based on the method described above. For example, the electronic device may determine that the user is located to face the estimated part in which the nail of the user's finger is located. The electronic device may change a direction of an object (for example, a message window, a picture, an application, a menu, or an icon) that is displayed on the display unit 310, based on the user's location. For example, the electronic device may display an object 318.

According to an embodiment, directivity of a distribution of nodes that have sensed a user input may be used as information that can execute various functions of the electronic device or an application. For example, if a direction of the electronic device or the display unit is a direction of at least one of a Landscape mode (for example, a mode in which the width of a rectangle is longer than the height) or a Portrait mode (for example, a mode in which the height of a rectangle is longer than the width), the electronic device (for example, the adjusting module 195) may execute another function of the electronic device, according to the direction.

According to an embodiment, if the electronic device recognizes a direction of a user's finger based on the distribution, the electronic device may determine in which direction the user is located with respect to the electronic device or the display unit. In this case, the electronic device may change the direction of the display unit based on the user's location. For example, the electronic device may change the direction of an object 314 being displayed on the electronic device 101, based on an input direction of the user's finger 312.

According to an embodiment, the object 314 (for example, a menu, a message, or a picture) may be displayed in a first direction (for example, an x-axis direction) through the display unit 310 functionally connected to the electronic device 101. In this case, the user may touch the display unit 310 in a second direction (for example, a y-axis direction). For example, the electronic device may rotate the object 314 displayed in the x-axis direction to display the object 318 in the y-axis direction, based on a user input (for example, an input gesture or a control gesture) applied in the y-axis direction.

Figure 3B:
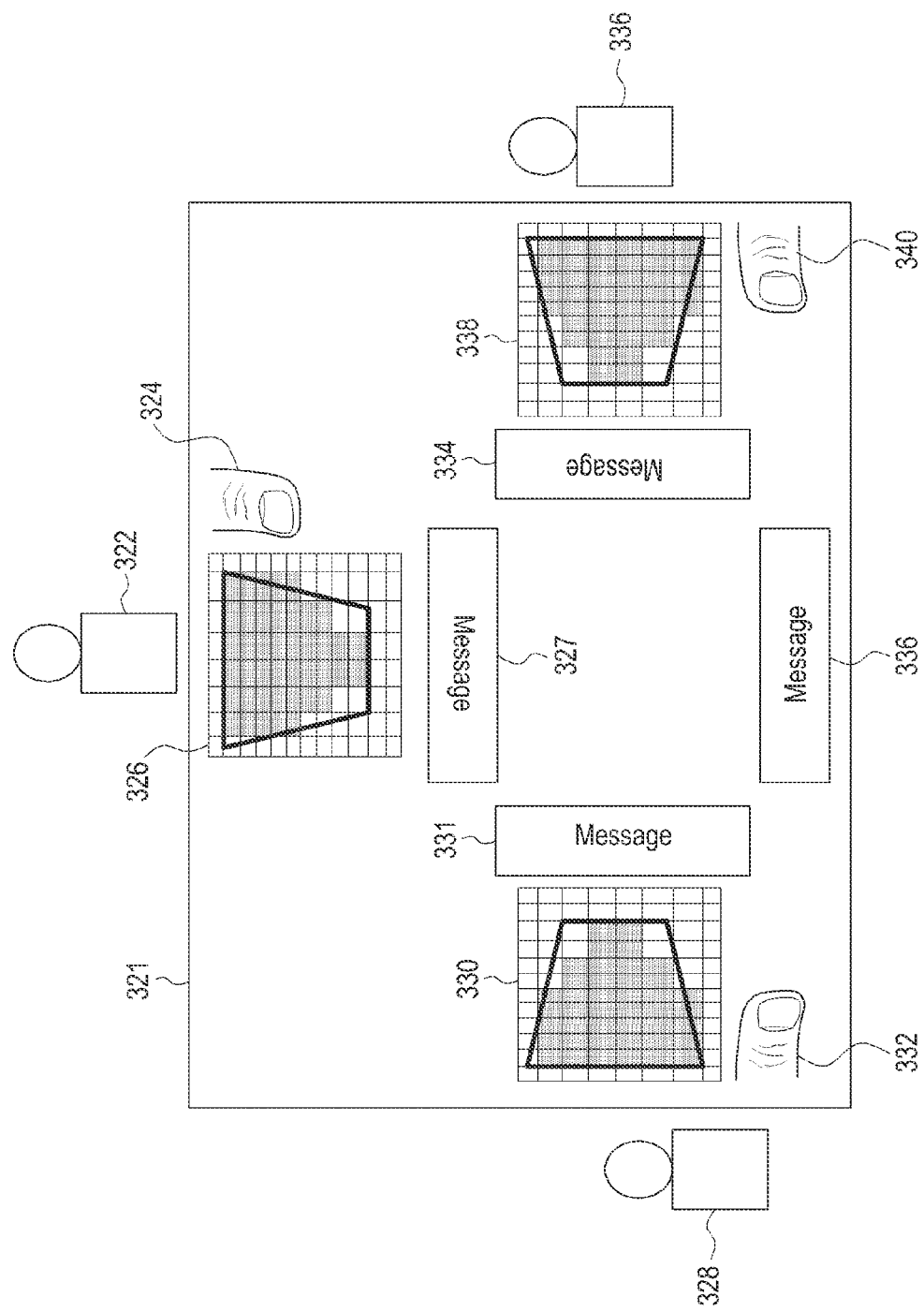
FIG. 3B is a view for describing an example of a method in which an electronic device according to various embodiments of the present disclosure displays an object through a display unit based on a user input.

FIG. 3B is a view for describing an example of a method in which an electronic device according to various embodiments of the present disclosure displays an object through a display unit based on a user input. Referring to FIG. 3B, an object 339 may be displayed in directions corresponding to the lines of sight of a plurality of users 322, 328, and 336, the users using a display unit 321 functionally connected to an electronic device (for example, the electronic device 101), based on directions of the users' fingers.

For example, if the user 322 is located at a first position (for example, a position facing the upper part of the display unit 321) with respect to the display unit 321, the electronic device may determine a direction of the user's finger 324, based on a distribution 326 of nodes that sense the user's finger 324 touching the display unit 321. Also, the electronic device may display the object 339 in a first output direction 327 according to the user's position determined based on the user's finger 324.

According to another example, if the user 336 is located at a second position (for example, a position facing the right part of the display unit 321) with respect to the display unit 321, the electronic device may display the object 339 which is an example of an application in a second direction 334 in which the user 336 can look the display unit 321 straight, based on a distribution 338 of nodes that sense the user's finger 340. For example, if the user 328 is located at a second position (for example, a position facing the left part of the display unit 321) with respect to the display unit 321, the electronic device may display the object 339 in a second direction 331 in which the user 328 can look the display unit 321 straight, based on a distribution 330 of nodes that sense the user's finger 332.

Figure 4A:
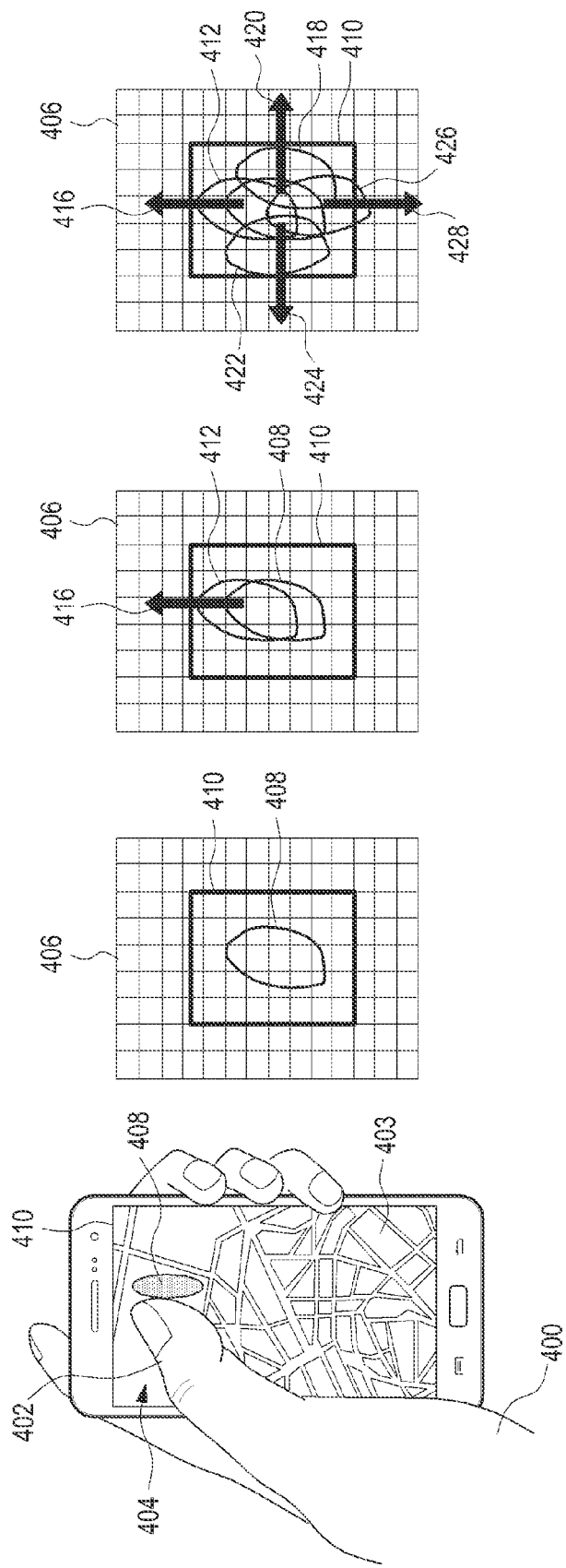
FIG. 4A is a view for describing an example of a method in which an electronic device according to various embodiments of the present disclosure determines an input direction corresponding to a user input.

FIG. 4A is a view for describing an example of a method in which an electronic device according to various embodiments of the present disclosure determines an input direction corresponding to a user input. Referring to FIG. 4A, the electronic device (for example, the electronic device 101) may execute a map application. In this case, the electronic device may provide, as a user interface, various contents (for example, a map, a direction indicator, a route search function, a location information providing function of providing information about a current location of a user 400 or the electronic device 101, or a building name, hereinafter, for convenience of description, referred to as "map") 403 corresponding to the map application, to a user 400, through a display unit 404. According to an embodiment, the user 400 may input an input gesture 402 through the display unit 404 in order to control the map application (for example, in order to zoom in/out the map or to use a function related to the map application).

For example, the electronic device may acquire an input gesture 402 (for example, a touch input or a hovering input) from the user 400 through the display unit 404. According to an embodiment, if one or more nodes 406 in the display unit 404 respond to the input gesture 402 (for example, if capacitance values of one or more nodes 406 in the display unit 404 change), the electronic device may acquire an area 408 corresponding to the nodes 406. According to an embodiment, if at least one part of the area 408 corresponding to the input gesture 402 is maintained for a predetermined time period (for example, about 0.2 seconds), the electronic device may determine a virtual input area 410 to receive a control gesture for controlling the map application, based on the input gesture 402. The electronic device may zoom in/out or rotate the map, or display a map of another region not displayed on the map through the display unit 404, based on a control gesture input within the input area 410.

According to an embodiment, due to a minute movement of an object (for example, one or more of a user's finger or an electronic pen) touching or hovering over the display unit 404, values (for example, capacitance quantities changing by static electricity from the finger) that are sensed through the nodes of the display unit 404 may vary non-uniformly. For example, when an electronic pen contacts the surface of the display unit 404, a wrong operation (for example, hook) may occur due to slipping or shaking of the electronic pen. According to an embodiment, in order to process such a wrong operation, the electronic device may provide a gesture corresponding to a touch input of touching the display unit 404 with a predetermined time period until a movement of the gesture is stabilized. Thereby, the wrong operation (for example, hook) may be prevented.

According to an embodiment, if an input gesture is maintained for a predetermined time period (for example, if at least one part of the area 408 corresponding to the input gesture 402 is maintained for a predetermined time period), the input area 410 may be determined so that the electronic device can distinguish a normal touch event (for example, a touch input or a hovering input applied after touching or hovering over the display unit 404 is released) from a wrong operation (for example, hook) to process them separately. For example, if another input event is generated within a predetermined time period after a touch input is acquired, the electronic device may determine the other input event as a normal touch event (for example, double click). In this case, the electronic device may execute a function of the electronic device or a function of an application, corresponding to the normal touch input, without setting any input area 410.

According to an embodiment, in order to set the input area 410, the electronic device may check (for example, analyze) input values of nodes of the touch panel at regular time intervals (per about 0.1 seconds), after a touch input (for example, an input gesture) is generated. Also, if differences between input values of nodes that sense touch inputs generated at regular time intervals are equal to or smaller than a reference value (for example, a threshold value), the electronic device may determine that a degree of movement of a user input is equal to or less than a reference degree of movement.

For example, if a movement of a user input is minute (for example, if about 90% or more of a touched area is maintained) so that a degree of the movement is determined as "low" (for example, if degrees of movements are classified into "high", "medium", and "low"), differences between input values of the nodes that sense the input values may be determined to be equal to or smaller than the reference value (for example, the threshold value). In this case, the electronic device may determine that the area 408 in which the nodes respond does not change greatly. For example, if degrees of change are classified into "high", "medium", and "low", the electronic device determines that there is a change of "low". If the area 408 in which the nodes respond does not change greatly for a predetermined time period (for example, if a degree of the change corresponds to "low" when degrees of changes are classified into "high", "medium", and "low"), the electronic device may determine that the input gesture is maintained, and set the virtual input area 410 for detecting a control gesture.

According to an embodiment, if a first area 412 acquired by a control gesture in an area (for example, the input area 410 or an area adjacent to the input area 410) corresponding to the input area 410 is located above the area 408 acquired by the input gesture 402, the electronic device may determine a movement direction of the user input as a first direction 416 toward the upper part of the display unit 404 from the lower part. If a second area 418 acquired by a control gesture in an area (for example, the input area 410 or an area adjacent to the input area 410) corresponding to the input area 410 is located to the right of the area 408 acquired by the input gesture 402, the electronic device may determine a movement direction of the user input as a second direction 420 toward the right part of the display unit from the left part.

According to another embodiment, if an input area 422 acquired by a control gesture is located to the left of the area 408 acquired by a first gesture, the electronic device may determine a direction of the user input as a direction 424 toward the right part of the display unit from the left part. If a first area 412 acquired by a control gesture is located above the area 408 acquired by the input gesture 402, the electronic device may determine a movement direction of the user input as the first direction 416 toward the upper part of the display unit from the lower part. If a first area 426 acquired by a second gesture is located below the area 408 acquired by the first gesture, the electronic device may determine a direction of the user input as a direction 428 toward the lower part of the display unit from the upper part.

Figure 4B:
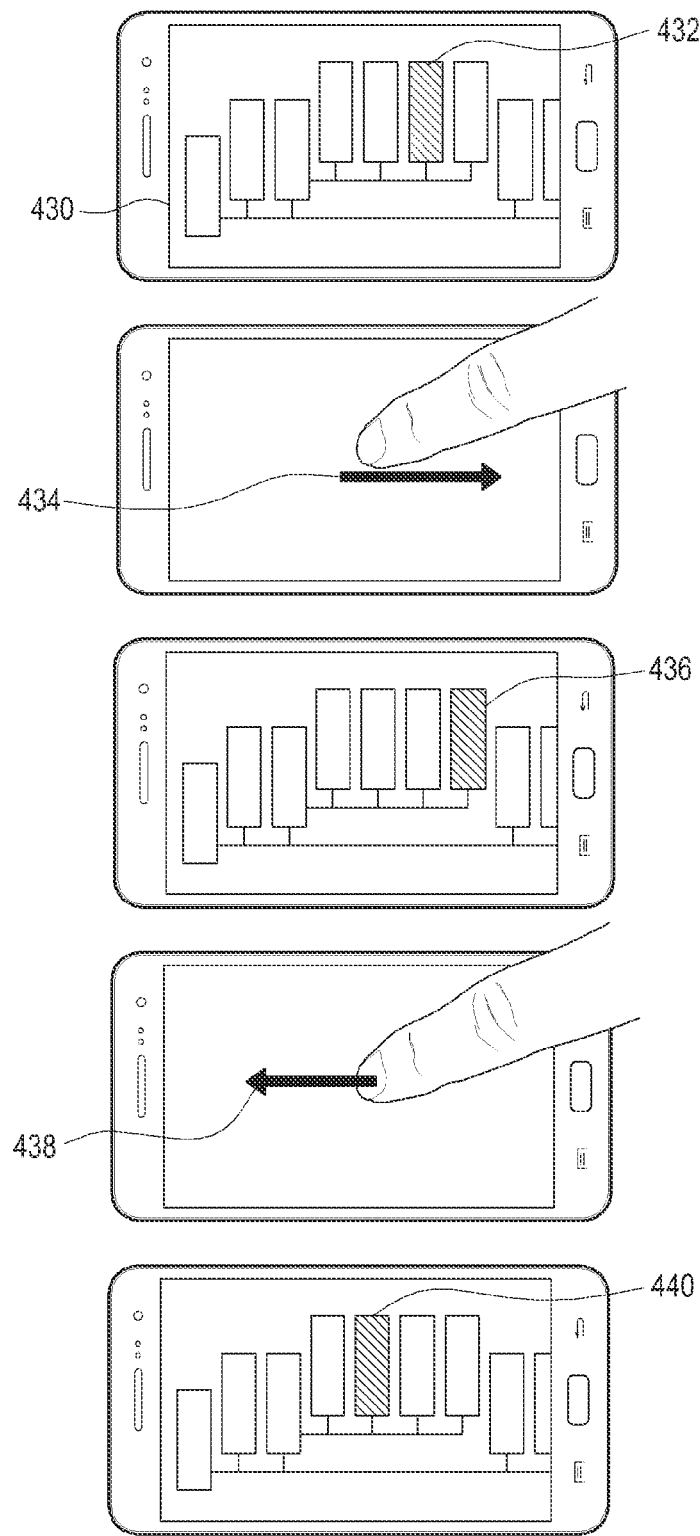
FIG. 4B is a view for describing an example of a method in which an electronic device according to various embodiments of the present disclosure moves a menu of an application according to a user input.

FIG. 4B is a view for describing an example of a method in which an electronic device according to various embodiments of the present disclosure moves a menu of an application according to a user input. Referring to FIG. 4B, the electronic device (for example, the electronic device 101) may select at least one menu from among a plurality of menus included in an application, based on a user input. According to an embodiment, the electronic device may acquire an input gesture according to a user input, and determine a virtual input area based on the input gesture. Also, the electronic device may determine a control gesture through at least one part of the input area. According to an embodiment, the electronic device may select at least one menu 432, 436, or 440 from a screen 430 of the application, based on at least one of a time period for which a control gesture is sensed, a size of an area in which the control gesture is sensed, a movement direction in which the input gesture moves to the control gesture, or intensity at which the control gesture is sensed.

For example, if a direction in which an input gesture moves to a control gesture is a first direction 434 (for example, a direction toward the right of the display unit from the left) in an area (for example, in the input area) corresponding to an input area, the electronic device may change a selection menu (for example, a menu focused or activated by a user's selection) of the application from the menu 432 to the menu 436, and move a user interface to display the selection menu. If the direction of the user input changes to a direction (for example, a direction 438) from right to left, the electronic device may change a selection menu of the application from the menu 432 to the menu 440. A menu that is selected by the input may move in a up/down/left/right direction.

Figure 4C:
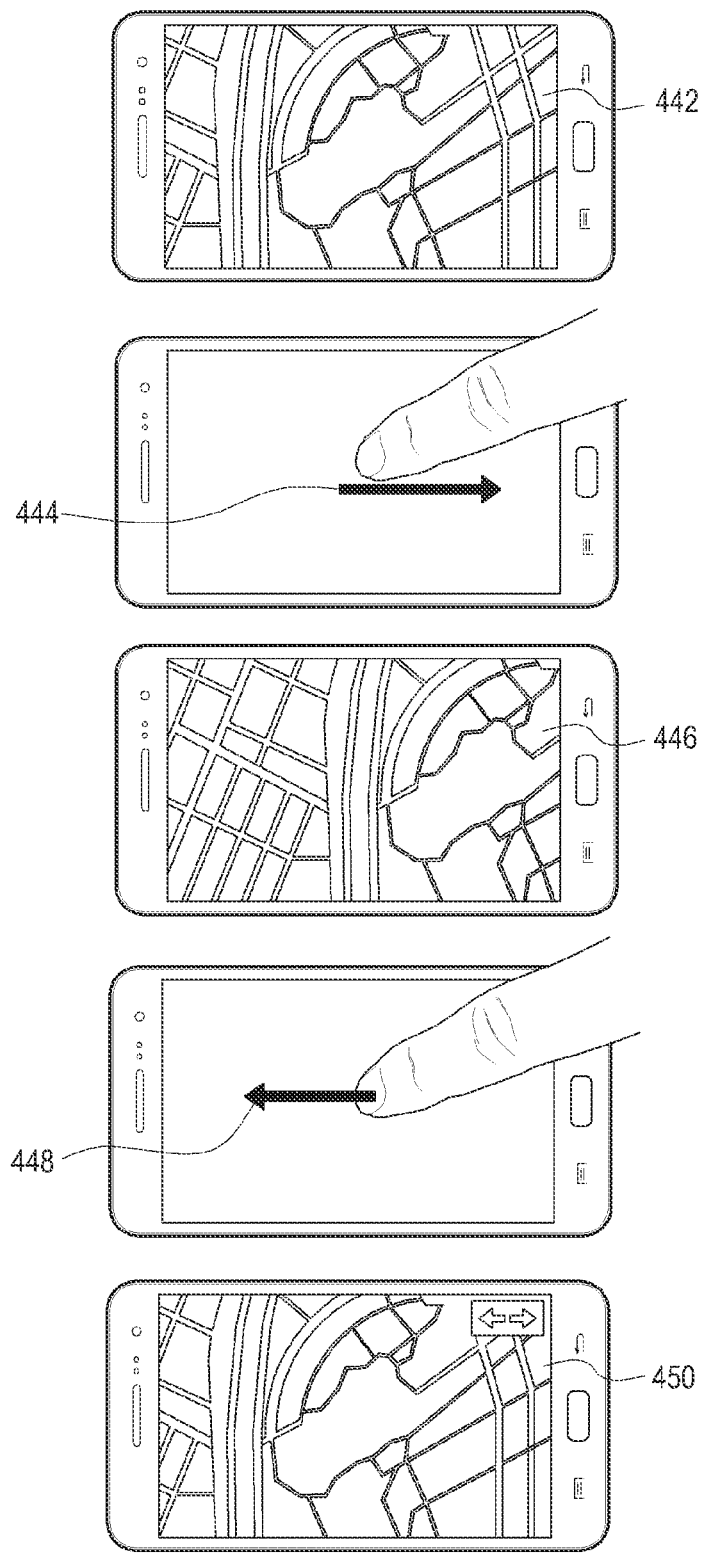
FIG. 4C is a view for describing an example of a method in which an electronic device according to various embodiments of the present disclosure moves content of an application according to a user input.

FIG. 4C is a view for describing an example of a method in which an electronic device according to various embodiments of the present disclosure moves content of an application according to a user input. Referring to FIG. 4C, the electronic device (for example, the electronic device 101) may move content (for example, a map, a picture, a web page, an Ebook page, navigation, or multimedia) included in one or more applications, based on a control gesture. According to an embodiment, if a movement direction of a control gesture is a first direction 444 (for example, a direction toward the right of the display unit from the left), the electronic device may move a map in the right direction to display a second part 446 moved from a first part 442 of the map. If a user's input is moved from right to left (for example, a direction 448), the electronic device may move content (for example, the first part 446) of the application to the left to display content 450.

Figure 4D:
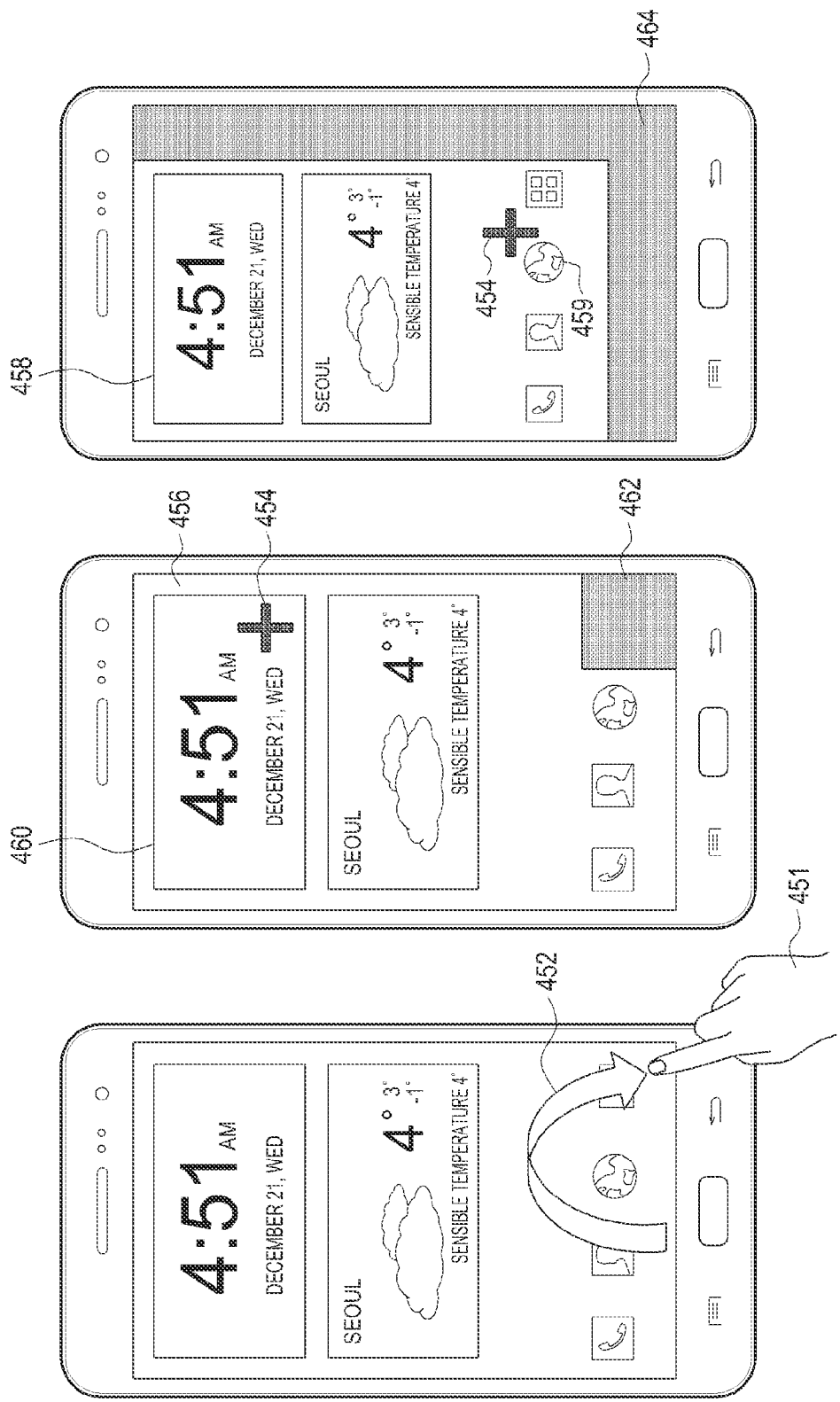
FIG. 4D is a view for describing an example of a method in which an electronic device according to various embodiments of the present disclosure controls a virtual pointer according to a user input.

FIG. 4D is a view for describing an example of a method in which an electronic device according to various embodiments of the present disclosure controls a virtual pointer according to a user input. Referring to FIG. 4D, if the electronic device (for example, the electronic device 101) detects a gesture 452 (for example, an input gesture) from a user 451, a translucent or transparent input area 456 may be activated in at least one area of an application screen of the electronic device 101. The electronic device may control a virtual pointer 454 based on a user input (for example, a control gesture) detected on the input area 462. For example, the virtual pointer 454 may be displayed through the display unit of the electronic device, based on the gesture 452.

According to an embodiment, the electronic device may move the virtual pointer 454 according to the user input detected in the input area 462. For example, if the user input moves from right to left in the input area 462 (for example, if a control gesture is input after the input gesture), the electronic device may move the virtual pointer 454 to the left.

According to an embodiment, if the user again touches the touch panel (for example, if the user releases the previous touch input, and then again touches the display unit), the electronic device may perform operation (for example, selection, execution, or displaying related information) related to an object at which the virtual pointer 454 is positioned. For example, if an icon (for example, an Internet icon) of an application (for example, a web browser) is located at a point at which the virtual pointer 454 is positioned, the electronic device may execute the corresponding application (for example, the web browser).

According to an embodiment, a translucent or transparent input area 464 may be activated in at least one area (for example, the left or lower area of the display unit) of the application screen 456 of the electronic device 101. The electronic device may reduce the size of the application screen 456 based on the size of the input area 464 to display a reduced application screen 458.

Figure 5A:
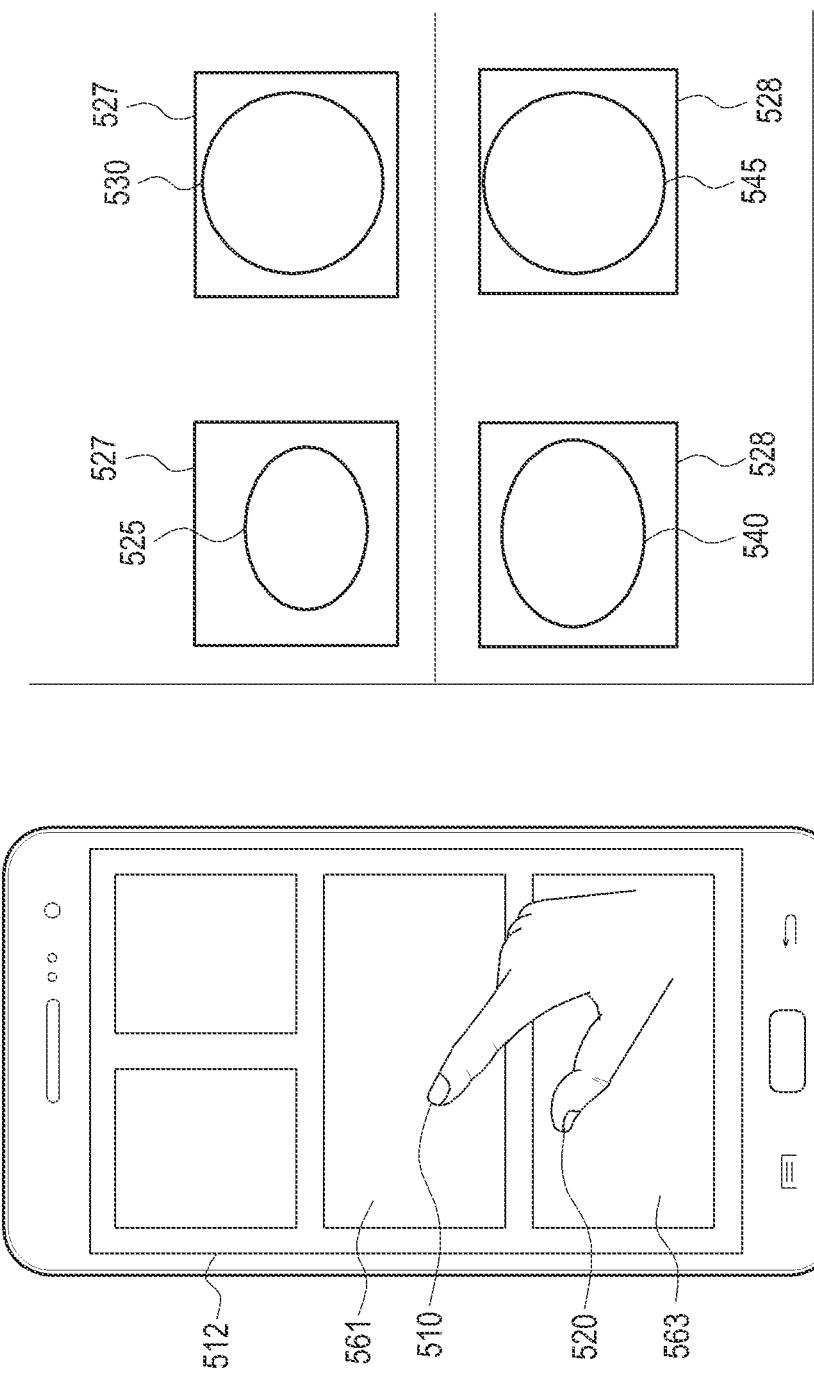
FIG. 5A is a view for describing an example of a method in which an electronic device according to various embodiments of the present disclosure controls an application based on one or more user inputs.

FIG. 5A is a view for describing an example of a method in which an electronic device according to various embodiments of the present disclosure controls an application based on one or more user inputs (for example, a multi-touch input). Referring to FIG. 5A, the electronic device (for example, the electronic device 101) may control an application 512 being executed on the electronic device, based on a plurality of user inputs (for example, a first user input 510 and a second user input 520) input through a touch panel (for example, the display unit 150) functionally connected to the electronic device 101. According to an embodiment, the electronic device may detect the first user input 510 and the second user input 520 through nodes of the touch panel. Also, the electronic device may control functions of the electronic device or an application, based on a first area corresponding to the first user input 510 and a second area corresponding to the second user input 520.

For example, the electronic device may acquire a first area 525 of one or more nodes that sense the first user input 510, and a second area 540 of one or more nodes that sense the second user input 520. Also, the electronic device may set a first virtual input area 527 corresponding to the first area 525 or a second virtual area 528 corresponding to the second area 540, based on the first area 525 and the second area 540. According to an embodiment, the electronic device may sense an additional user input through at least one part of the first input area 527 or the second input area 528.

For example, the electronic device may acquire a first additional input corresponding to a first additional area 530 having a larger size than the first area 525, through the first input area 527. In this case, the electronic device may execute a function of a first application 561 (for example, a sub function or content of an application, or one of a plurality of applications displayed through the display unit) corresponding to a location of the first user input 510. According to another embodiment, the electronic device may acquire a first additional input corresponding to a second additional area 545 having a larger size than the second area 545, through the second input area 528. In this case, the electronic device may execute a function of a second application 563 corresponding to a location of the second user input 520.

According to an embodiment, if the first additional input and the second additional input are acquired at the same time for a predetermined time period, the electronic device may execute a function that is different from functions that are executed when the first additional input and the second additional input are acquired independently. For example, the electronic device may execute various functions, such as zooming in/out content of an application that is displayed through the display unit, adjusting brightness of the display unit, executing a mute function of the electronic device, or changing the location of the first application 561 with the location of the second application 563.

Figure 5B:
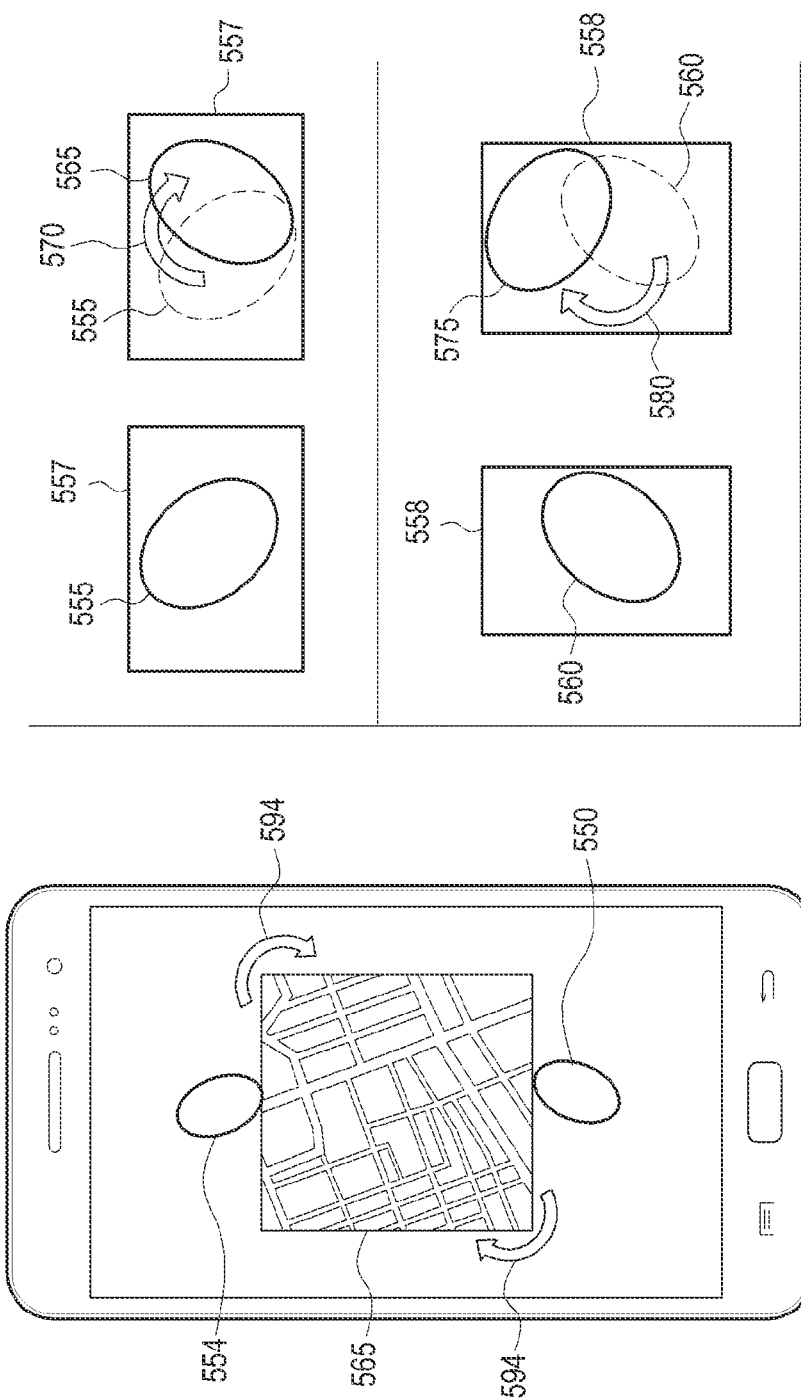
FIG. 5B is a view for describing an example of a method in which an electronic device according to various embodiments of the present disclosure controls an application based on one or more user inputs.

FIG. 5B is a view for describing an example of a method in which an electronic device according to various embodiments of the present disclosure controls an application based on one or more user inputs (for example, a multi-touch input). Referring to FIG. 5B, the electronic device (for example, the electronic device 101) may control an application 565 being executed on the electronic device, based on a direction (for example, a clockwise direction or a counterclockwise direction) of a plurality of user inputs (for example, a first user input 554 and a second user input 550) input through a touch panel (for example, the display unit 150) functionally connected to the electronic device 101.

According to an embodiment, the electronic device may detect the first user input 554 and the second user input 550 through nodes of the display unit. Also, the electronic device may control functions of the electronic device or an application, based on a first area corresponding to the first user input 554 and a second area corresponding to the second user input 550.

For example, the electronic device may acquire a first area 555 of one or more nodes that sense the first user input 554, and a second area 560 of one or more nodes that sense the second user input 550. Also, the electronic device may set a first virtual input area 557 corresponding to the first area 555 and a second virtual input area 558 corresponding to the second area 560, based on the first area 555 or the second area 560. According to an embodiment, the electronic device may detect an additional user input through at least one part of the first input area 557 or the second input area 558.

For example, the electronic device may acquire a first additional input corresponding to a first additional area moved in a first direction 570 from the first area 555, through the first input area 557. In this case, the electronic device may control functions of an application 565 (for example, a sub function or content of an application, or one of a plurality of applications displayed through the display unit). For example, the electronic device may rotate a map or a picture in the first direction 570, in correspondence to the first direction 570. As another example, the electronic device may turn on/down the volume (for example, the volume of speaker sound) of the electronic device, in correspondence to the first direction 570.

For example, the electronic device may acquire a second additional input corresponding to a second additional area moved in a second direction 580 from the second area 560, through the second virtual input area 558. In this case, the electronic device may control a function of the application 565 (for example, a sub function or content of an application, or one of a plurality of applications displayed through the display unit). For example, the electronic device may rotate a map or a picture in the second direction 580, in correspondence to the second direction 580. For example, the electronic device may turn up/down the volume (for example, the volume of speaker sound) of the electronic device, in correspondence to the second direction 580.

According to an embodiment, the electronic device may include a display unit to acquire at least one gesture, and an input control module functionally connected to the display unit, wherein the input control module may determine an input area of the display unit, corresponding to a first gesture acquired through the display unit, determine a second gesture through at least one part of the input area, and adjust at least one function of the electronic device according to at least one of a time period for which the second gesture is sensed, a size of an area in which the second gesture is sensed, intensity at which the second gesture is sensed, or a movement direction in which the first gesture moves to the second gesture, in the at least one part of the input area.

According to an embodiment, if the first gesture is maintained for a predetermined time period, the input control module may determine the input area based on the first gesture.

According to an embodiment, if the time period, the size, the movement direction, or the intensity are a first time period, a first size, a first movement direction, or first intensity, the input control module may adjust the at least one function to a first degree; and if the time period, the size, the movement direction, or the intensity are a second time period, a second size, a second movement direction, or second intensity, the input control module may adjust the at least one function to a second degree.

According to an embodiment, the input control module may determine whether there is text displayed on the display unit, and select a word, a sentence, or a paragraph from the text based on the at least one.

According to an embodiment, if the time period is a first time period, the input control module may zoom in/out content of an application to a first degree, and if the time period is a second time period, the input control module may zoom in/out the content to a second degree.

According to an embodiment, if the movement direction is a first movement direction, the input control module may move a menu or content of an application in a first direction, and if the movement direction is a second movement direction, the input control module may move the menu or the content in a second direction.

According to an embodiment, the display unit may include a first sub area and a second sub area. If the second gesture is acquired from the first sub area, the input control module may perform a first function, and if the second gesture is acquired from the second sub area, the input control module may perform a second function.

According to an embodiment, the input control module may determine a direction of a user's line of sight with respect to the electronic device, based on the first gesture or the second gesture.

According to an embodiment, if the direction of the user's line of sight is a first direction of a line of sight, the input control module may display an object that is to be output through the display unit, in a first direction, and if the direction of the user's line of sight is a second direction of a line of sight, the input control module may display the object in a second direction.

According to an embodiment, the input control module may display a cursor corresponding to the first gesture in at least one area of the display unit.

According to an embodiment, if the direction is a first movement direction, the input control module may move the cursor in a first direction of the display unit, and if the direction is a second movement direction, the input control module may move the cursor in a second direction of the display unit.

According to an embodiment, the input control module may display the input area, as a user interface, on the display unit.

According to an embodiment, the input control module may adjust speed at which functions of applications of the electronic device are controlled, based on the at least one gesture (for example, the first gesture or the second gesture).

According to an embodiment, if the second gesture corresponds to the first gesture, the input control module may stop adjusting the functions or restore adjusted functions to previous states before the functions have been adjusted.

According to an embodiment, the input control module may control scroll speed, page turning speed, or zoom in/out speed, based on the time period.

According to an embodiment, the input control module may rotate content of an application in at least one direction of a clockwise direction or a counterclockwise direction, based on the movement direction.

According to an embodiment, the input control module may adjust the volume of the electronic device or the application, based on the movement direction.

Figure 6:
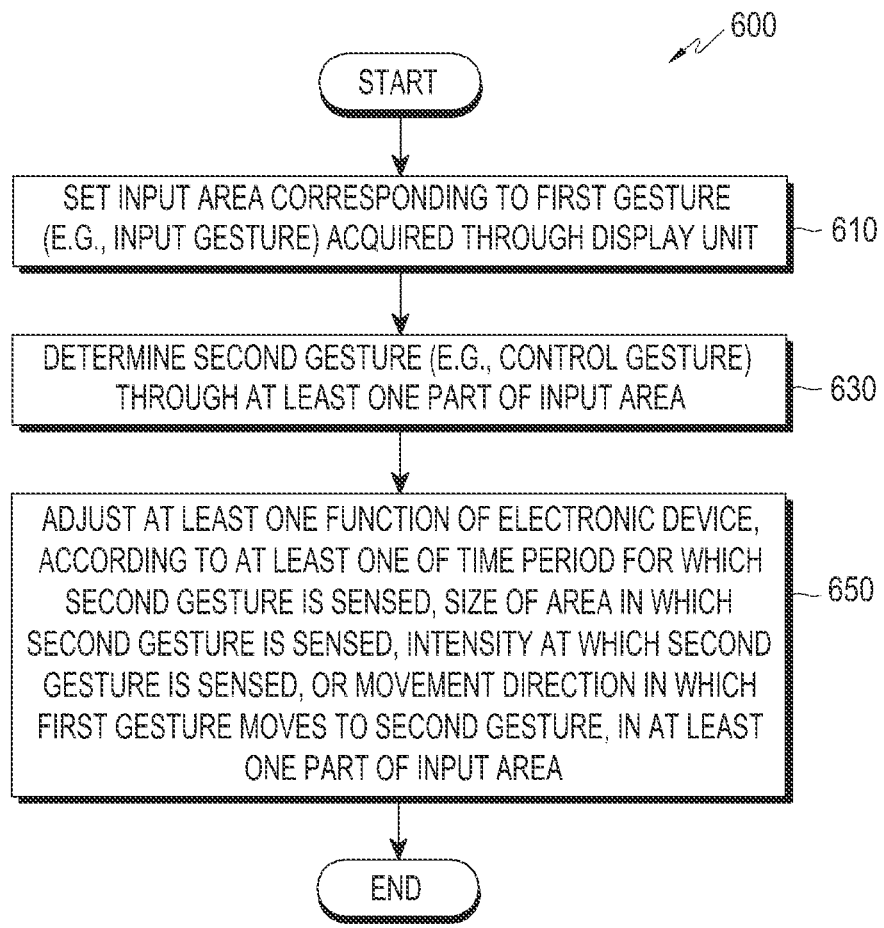
FIG. 6 is a flowchart illustrating a method in which an electronic device according to various embodiments of the present disclosure controls at least one function of the electronic device based on a user input.

FIG. 6 is a flowchart 600 illustrating a method in which an electronic device (for example, the electronic device 101) according to various embodiments of the present disclosure controls at least one function of the electronic device based on a user input. In operation 610, the electronic device may set an input area (for example, a virtual input area) corresponding to a user's first gesture (for example, an input gesture) acquired through the display unit (for example, the display unit 150).

In operation 630, the electronic device may determine the user's second gesture (for example, a control gesture) through at least one part of the input area. The control gesture may be acquired when the user changes a direction of his/her finger or a pressing force, without taking the finger off the display unit or stopping hovering over the display unit, after inputting the input gesture.

In operation 650, the electronic device may adjust at least one function (for example, a function of the electronic device or a function of an application being executed on the electronic device) of the electronic device, according to at least one of a time period for which the second gesture is sensed, a size of an area in which the second gesture is sensed, intensity at which the second gesture is sensed, or a movement direction in which the first gesture moves to the second gesture, in the at least one part of the input area. For example, if the movement direction in which the first gesture moves to the second gesture is a specific direction, the electronic device may move content or a menu of an application in a predetermined direction corresponding to the specific direction.

Figure 7:
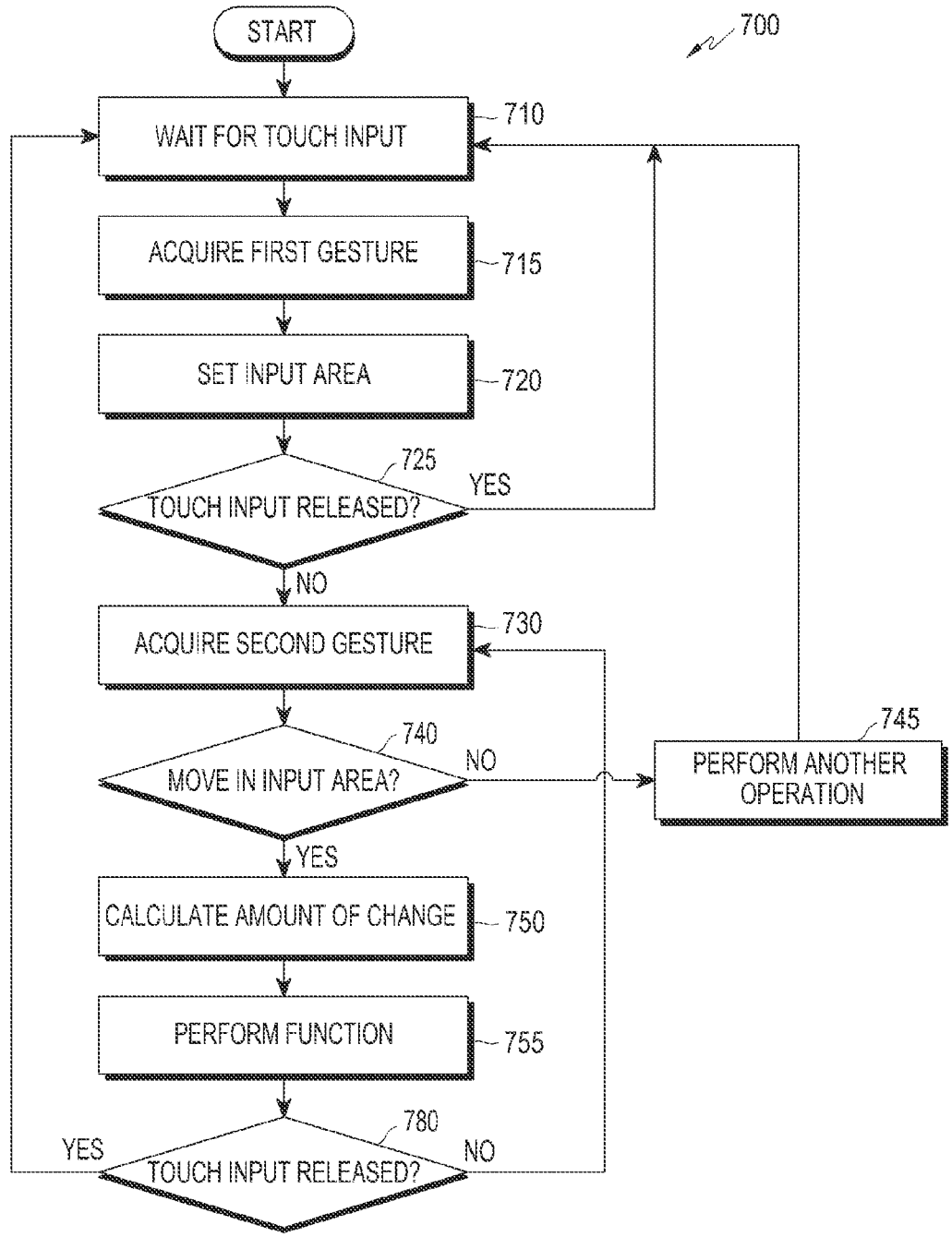
FIG. 7 is a flowchart illustrating a method in which an electronic device according to various embodiments of the present disclosure controls an application according to one or more gestures.

FIG. 7 is a flowchart 700 illustrating a method in which an electronic device according to various embodiments of the present disclosure controls an application according to one or more gestures. In operation 710, the electronic device (for example, the electronic device 101) may wait for a user's touch input (for example, a gesture of directly contacting or hovering over the touch panel at a predetermined distance, or a gesture including a predetermined gesture) input through the touch panel (for example, the display unit 150). According to an embodiment, the electronic device may be activated (for example, woken up) at regular time periods to determine whether a user input of touching the touch panel (for example, touching or hovering over the touch panel) is received.

In operation 715, the electronic device may acquire a first gesture input by the user through the touch panel. In operation 720, the electronic device may set an input area based on the first gesture. For example, the input area may be set to a predetermined area based on the locations of sensors (for example, capacitance nodes) that sense the first gesture. In operation 725, the electronic device may determine whether the user has released the touch input. For example, if touch values generated by the first gesture are maintained for a predetermined time period and then any touch values are no longer sensed, the electronic device may determine that a user has released the touch input of touching the touch panel with his/her finger.

According to an embodiment, if it is determined that the user does not touch the touch panel (for example, if the user has released the touch input), the electronic device may return to operation 710 of waiting for a touch input. If the touch input is not released, the electronic device may acquire a second gesture, in operation 730. For example, if a first gesture is acquired in operation 715, and the touch input is not released for a predetermined time period, the electronic device may acquire a second gesture through touch sensors of the electronic device.

In operation 740, the electronic device may determine whether at least one part of capacitance nodes that sense the second gesture is included in the input area. In operation 745, if an area corresponding to the second gesture is out of the input area, the electronic device may perform operations corresponding to the second gesture, without associating the second gesture with the first gesture. For example, the electronic device may select an icon corresponding to a location of the second gesture, or execute an application corresponding to the location of the second gesture, in response to the second gesture.

In operation 750, if the second gesture is generated in the input area, the electronic device may calculate an amount of change of the user input, based on an area corresponding to the first gesture and an area corresponding to the second gesture. For example, the electronic device may determine intensities of forces corresponding to the first gesture and the second gesture, a direction in which the first gesture moves to the second gesture, a difference in size between an area corresponding to the first gesture and an area corresponding to the second gesture, or a maintenance time period of the second gesture after the first gesture has changed to the second gesture.

In operation 755, the electronic device may perform at least one function (for example, a function of the electronic device or at least one function of applications that are executed on the electronic device) of the electronic device, corresponding to the measured amount of change, based on the measured amount of change. According to an embodiment, the electronic device may measure a time period for which a touch input for the first gesture is maintained, and a time period for which a touch input for the second gesture is maintained, respectively. The electronic device may control (for example, zoom in/out or move) a user interface, based on the time periods. For example, if the second gesture generates an event of causing an image viewer to zoom in/out images, the electronic device may be set to increase zoom in/out speed as a time period for which the second gesture is input increases.

According to an embodiment, the electronic device may measure changes in distribution of input signals of the display unit at regular time intervals, and determine that a touch input (for example, the second gesture) is completed, if the amount of changes is smaller than predetermined criteria.

In operation 780, the electronic device may determine whether the user's touch input has been released. According to an embodiment, the electronic device may determine whether the user's touch input has been released, and if the user's touch input has been not released, the electronic device may return to operation 730 to acquire the second gesture through at least one part of the input area. If the electronic device determines that the user's touch input has been released, the electronic device may return to operation 710 to wait for a user's touch input.

According to an embodiment, a method of controlling an input in an electronic device may include determining an input area of the display unit functionally connected to the electronic device, the input area corresponding to a first gesture acquired through the display unit; determining a second gesture through at least one part of the input area; and adjusting at least one function of the electronic device, according to at least one of a time period for which the second gesture is sensed, a size of an area in which the second gesture is sensed, intensity at which the second gesture is sensed, or a movement direction in which the first gesture moves to the second gesture, in the at least one part of the input area.

According to an embodiment, the determining of the input area of the display unit may include determining the input area based on the first gesture if the first gesture is maintained for a predetermined time period, According to an embodiment, the adjusting of the at least one function of the electronic device may include adjusting the at least one function to a first degree if the time period, the size, the movement direction, or the intensity are a first time period, a first size, a first movement direction, or first intensity, and adjusting the at least one function to a second degree if the time period, the size, the movement direction, or the intensity are a second time period, a second size, a second movement direction, or second intensity.

According to an embodiment, the adjusting of the at least one function of the electronic device may include determining whether there is text displayed on the display unit, and selecting a word, a sentence, or a paragraph from the text based on the at least one (the at least one of the time period, the size, the intensity, or the movement direction).

According to an embodiment, the adjusting of the at least one function of the electronic device may include determining whether there are a plurality of objects (for example, list items, icons, or thumbnail images) displayed on the display unit, and selecting one or more objects of the objects based on the at least one (the at least one of the time period, the size, the intensity, or the movement direction).

According to an embodiment, the adjusting of the at least one function of the electronic device may include zooming in/out content of an application to a first degree if the time period is a first time period, and zooming in/out the content to a second degree if the time period is a second time period.

According to an embodiment, the adjusting of the at least one function of the electronic device may include moving a menu or content of an application in a first direction if the movement direction is a first movement direction, and moving the menu or the content in a second direction if the movement direction is a second movement direction.

According to an embodiment, the display unit may include a first sub area and a second sub area, and the adjusting of the at least one function of the electronic device may include performing a first function if the second gesture is acquired from the first sub area, and performing a second function if the second gesture is acquired from the second sub area.

According to an embodiment, the adjusting of the at least one function of the electronic device may include determining a direction of a user's line of sight with respect to the electronic device, based on the first gesture or the second gesture.

According to an embodiment, the determining of the direction of the user's line of sight may include displaying an object that is to be output through the display unit, in a first direction, if the direction of the user's line of sight is a first direction of a line of sight, and displaying the object in a second direction if the direction of the user's line of sight is a second direction of a line of sight.

According to an embodiment, the adjusting of the at least one function of the electronic device may include adjusting the at least one function to a first degree if the time period, the size, the movement direction, or the intensity is a first time period, a first size, a first movement direction, or first intensity, and adjusting the at least one function to a second degree if the time period, the size, the movement direction, or the intensity is a second time period, a second size, a second movement direction, or second intensity.

According to an embodiment, the adjusting of the at least one function of the electronic device may include displaying a cursor corresponding to the first gesture in at least one area of the display unit.

According to an embodiment, the adjusting of the at least one function of the electronic device may include moving the cursor in a first direction of the display unit if the movement direction is a first movement direction, and moving the cursor in a second direction of the display unit if the movement direction is a second movement direction.

According to an embodiment, the adjusting of the at least one function of the electronic device may include displaying the input area as a user interface on the display unit.

According to an embodiment, the adjusting of the at least one function of the electronic device may include adjusting speed at which functions of applications of the electronic device are controlled, based on the at least one (the at least one of the time period, the size, the intensity, or the movement direction?).

According to an embodiment, the adjusting of the at least one function of the electronic device may include stopping adjusting the functions, or restoring adjusted functions to previous states before the functions have been adjusted, if the second gesture corresponds to the first gesture.

According to an embodiment, the adjusting of the at least one function of the electronic device may include controlling scroll speed, page turning speed, or zoom in/out speed, based on the time period.

According to an embodiment, the adjusting of the at least one function of the electronic device may include rotating content of an application in at least one direction of a clockwise direction or in a counterclockwise direction, based on the movement direction.

According to an embodiment, the adjusting of the at least one function of the electronic device may include adjusting the volume of the electronic device or the application, based on the movement direction.

Figure 8:
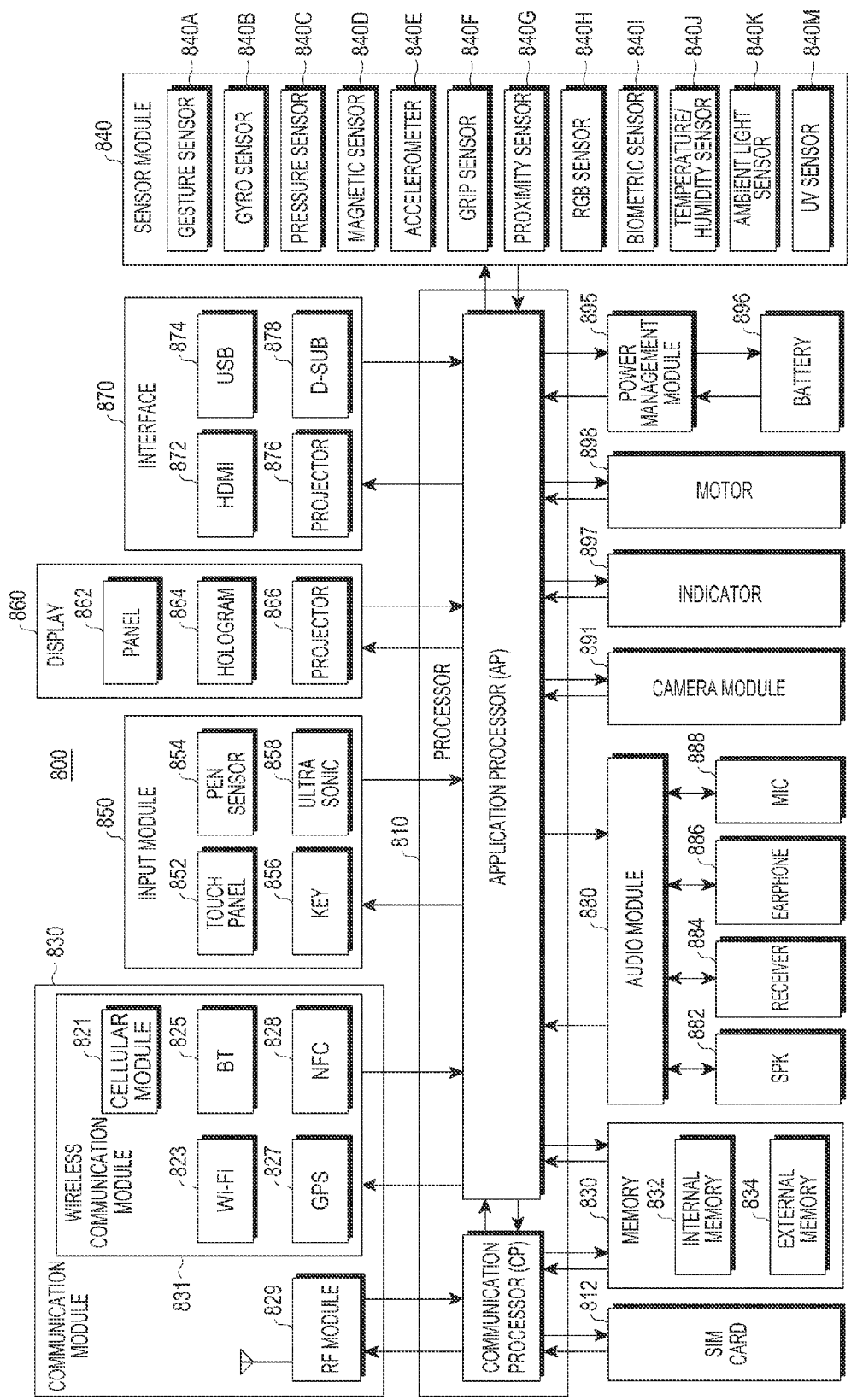
FIG. 8 is a block diagram of hardware according to various embodiments of the present disclosure.

FIG. 8 is a block diagram of an electronic device 800 according to various embodiments of the present disclosure. For example, the electronic device 800 may configure the entire or a part of the electronic device 101 shown in FIG. 1. Referring to FIG. 8, the electronic device may include at least one application processor (AP) 810, a communication module 820, a Subscriber Identification Module (SIM) card 824, a memory 830, a sensor module 840, an input unit 850, a display unit 860, an interface 870, an audio module 880, a camera module 891, a power management module 895, a battery 896, an indicator 897, and a motor 898.

The AP 810 may drive Operating System (OS) or an application program to control a plurality of hardware or software components connected to the AP 810, and perform processing and operations of various data including multimedia data. The AP 810 may be implemented as System on Chip (SoC). According to an embodiment, the AP 810 may further include a GPU (not shown).

The communication module 820 (for example, the communication interface 160 of FIG. 1) may perform data transmission and reception for communication between the electronic device 800 (for example, the electronic device 101) and other electronic devices (for example, the electronic device 104 or the server 106 of FIG. 1) connected to the electronic device 800 through a network. According to an embodiment, the communication module 820 may include a cellular module 821, a WiFi module 823, a BT module 825, a GPS module 827, a NFC module 828, and a Radio Frequency (RF) module 829.

The cellular module 821 may provide a voice call, a video call, a message service, or an internet service through a communication network (for example, LTE, LTE-A, CDMA, WCDMA, UMTS, WiBro, or GSM). Also, the cellular module 821 may identify and authenticate the electronic device 800 in a communication network, using a subscriber identification module (for example, the SIM card 824). According to an embodiment, the cellular module 821 may perform at least one part of functions that can be provided by the AP 810. For example, the cellular module 821 may perform at least one part of a multimedia control function.

According to an embodiment, the cellular module 821 may include a Communication Processor (CP). Also, the cellular module 821 may be implemented as SoC. In FIG. 8, components, such as the cellular module 821 (for example, Communication Processor (CP)), the memory 830, or the power management module 895, are shown as separate components, however, according to an embodiment, the AP 810 may be implemented to include at least one part (for example, the cellular module 821) of the aforementioned components.

According to an embodiment, the AP 810 or the cellular module 821 (for example, CP) may load a command or data received from at least one of a non-volatile memory or another component connected to the AP 810 or the cellular module 821 (for example, CP), in a volatile memory, and then process the command or data. Also, the AP 810 or the cellular module 821 may store data received from or created by at least one of other components, in a non-volatile memory.

The WiFi module 823, the BT module 825, the GPS module 827, or the NFC module 828 may include a processor to process data that is received or transmitted through the corresponding module. In FIG. 8, the cellular module 821, the WiFi module 823, the BT module 825, the GPS module 827, and the NFC module 828 are shown as separated blocks, however, according to an embodiment, at least one part (for example, two or more) of the cellular module 821, the WiFi module 823, the BT module 825, the GPS module 827, and the NFC module 828 may be included in a single integrated chip (IC) or a single IC package. For example, at least one part (for example, a communication processor corresponding to the cellular module 821 and a WiFi processor corresponding to the WiFi module 823) of processors corresponding to the cellular module 821, the WiFi module 823, the BT module 825, the GPS module 827, and the NFC module 828 may be implemented as single SoC.

The RF module 829 may perform data transmission and reception, for example, transmission and reception of RF signals. The RF module 829 may include, as not shown in FIG. 8, a transceiver, a Power Amp Module (PAM), a frequency filter, or a Low Noise Amplifier (LNA). Also, the RF module 829 may further include an element (for example, a conductor or a conducting wire) for transmitting/receiving electronic waves in free air space for wireless communication. In FIG. 8, the cellular module 821, the WiFi module 823, the BT module 825, the GPS module 827, are the NFC module 828 are shown to share the RF module 829, however, according to an embodiment, at least one of the cellular module 821, the WiFi module 823, the BT module 825, the GPS module 827, or the NFC module 828 may perform transmission/reception of RF signals through a separate RF module.

The SIM card 824 may be a card including a subscriber identification module, and may be inserted into a slot formed at a specific location of the electronic device. The SIM card 824 may include unique identification information (for example, Integrated Circuit Card Identifier (ICCID)) or subscriber information (for example, International Mobile Subscriber Identity (IMSI)).

The memory 830 (for example, the memory 130) may include an internal memory 832 or an external memory 834. The internal memory 832 may include at least one of a volatile memory (for example, Dynamic RAM (DRAM), Static RAM (SRAM), Synchronous Dynamic RAM (SDRAM), or the like), or a non-volatile memory (for example, One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, or the like).

According to an embodiment, the internal memory 832 may be a Solid State Drive (SSD). The external memory 834 may further include a flash drive, for example, Compact Flash (CF), Secure Digital (SD), Micro Secure Digital (Micro-SD), Mini Secure Digital (Mini-SD), extreme Digital (xD), or Memory Stick. The external memory 834 may be functionally connected to the electronic device 800 through various interfaces. According to an embodiment, the electronic device 800 may further include a storage device (or storage medium) such as a hard drive.

The sensor module 840 may measure physical quantity, sense an operation state of the electronic device 800, and convert the measured or sensed information into electrical signals. The sensor module 840 may include at least one of a gesture sensor 840A, a gyro sensor 840B, a pressure sensor 840C, a magnetic sensor 840D, an accelerometer 840E, a grip sensor 840F, a proximity sensor 840G, a color sensor 840H (for example, a RGB (Red, Green, Blue) sensor), a biometric sensor 840I, a temperature/humidity sensor 840J, an ambient light sensor 840K, or an Ultra Violet (UV) sensor 840M. Additionally or alternatively, the sensor module 840 may include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), or a fingerprint sensor (not shown). The sensor module 840 may further include a control circuit to control at least one sensor included therein.

The input device 850 may include a touch panel 852, a (digital) pen sensor 854, a key 856, or an ultrasonic input device 858. The touch panel 852 may be a capacitive type, a resistive type, an infrared type, or an ultrasonic type. Also, the touch panel 852 may further include a control circuit. If the touch panel 852 is a capacitive type, the touch panel 852 can recognize proximity as well as a direct touch input. The touch panel 852 may further include a tactile layer. In this case, the touch panel 852 may give a user tactile impression.

The (digital) pen sensor 854 may sense a pen touch input using a method that is the same as or similar to a method of receiving a touch input from a user. Also, the pen sensor 854 may sense a pen touch input using a recognition sheet. The key 856 may be a physical button, an optical key, or a keypad. The ultrasonic input device 858 may be a device capable of detecting data by sensing sound waves with a microphone (for example, a microphone 888) in the electronic device 800, through an input tool of generating ultrasonic signals. The ultrasonic input device 858 may enable RF identification (RFID). According to an embodiment, the electronic device 800 may receive a user input from an external device (for example, a computer or a server) connected to the electronic device 800, using the communication module 820.

The display 860 (for example, the display 150 of FIG. 1) may include a panel 862, a hologram 864, or a projector 866. The panel 862 may be a Liquid-Crystal Display (LCD) or an Active-Matrix Organic Light-Emitting Diode (AM-OLED). The panel 862 may be implemented to be flexible, transparent, or wearable. The panel 862 may be integrated into the touch panel 852. The hologram 864 may show a 3Dimensional (3D) image in the air using interference of light. The projector 866 may project light onto a screen to display an image. The screen may be located inside or outside the electronic device 800. According to an embodiment, the display 860 may further include a control circuit for controlling the panel 862, the hologram 864, or the projector 866.

The interface 870 may include, for example, High-Definition Multimedia Interface (HDMI) 872, a Universal Serial Bus (USB) 874, a projector 876, or a D-subminiature (D-sub) 878. The interface 870 may be, for example, included in the communication interface 160 shown in FIG. 1. Additionally or alternatively, the interface 870 may include, for example, a Mobile High-definition Link (MHL) interface, a Secure Digital (SD)/Multi-Media Card (MMC) interface, or an Infrared Data Association (IrDA) interface.

The audio module 880 may convert sound into electronic signals and vice versa. At least one component of the audio module 880 may be, for example, included in the input/output interface 140 shown in FIG. 1. The audio module 880 may process voice information input/output through, for example, a speaker 882, a receiver 884, earphones 886, or the microphone 888.

The camera module 891, which captures still images or moving images, may include one or more images sensors (for example, a front sensor or a rear sensor), lenses (not shown), an Image Signal Processor (ISP) (not shown), or a flash (for example, LED or xenon lamp) (not shown).

The power management module 895 may manage power of the electronic device 800. As not shown in FIG. 8, the power management 895 may include a Power Management Integrated Circuit (PMIC), a charge Integrated Circuit (IC), or a battery or fuel gauge.

The PMIC may be installed in an integrated circuit or a SoC semiconductor. A charging method may be classified into a wired type and a wireless type. The charge IC may charge a battery, and prevent inflow of overvoltage or overcurrent from a charger. According to an embodiment, the charge IC may include a charge IC for at least one of a wired charging method and a wireless charging method. The wireless charging method may be a magnetic resonance method, a magnetic induction method, or an electromagnetic wave method, and in order to perform the wireless charging method, the charge IC may include an additional circuit, for example, a coil loop, a resonance circuit, or a rectifier.

The battery gauge may measure, for example, a level of battery 896, and a voltage, a current, or a temperature during charging. The battery 896 may store or generate electricity, and supply power to the electronic device 800 using the stored or generated electricity. The battery 896 may be a rechargeable battery or a solar battery.

The indicator 897 may display a specific state (for example, a booting state, a message state, or battery level) of the electronic device 800 or a part (for example, the AP 810) of the electronic device 800. The motor 898 may convert electrical signals into mechanical vibration. Although not shown in FIG. 8, the electronic device 800 may include a processor (for example, GPU) for supporting a mobile TV. The processor may process media data based on a standard of Digital Multimedia Broadcasting (DMB), Digital Video Broadcasting (DVB), media flow, or the like.

Each of the above-described units of the electronic device 800 according to various embodiments of the present disclosure may be configured with one or more components, and the units may be termed according to a kind of the corresponding electronic device. The electronic device 800 may include at least one of the above-described units. Also, the electronic device 800 may omit some of the above-described units or further include another unit(s). Furthermore, some of the units of the electronic device 800 may be combined to constitute entity which performs the same functions as the corresponding units.

The term "module" used in the present disclosure may means a unit including, for example, hardware, software, firmware, or a combination thereof. The "module" may be interchangeably used with another term, such as "unit", "logic", "logical block", "component", or "circuit". The "module" may be a minimum unit or a part of components integrated into one body. Also, the "module" may be a minimum unit or a part for performing one or more functions. The "module" may be implemented mechanically or electronically. For example, the "module" may include at least one of an Application-Specific Integrated Circuit (ASIC) chip, Field-Programmable Gate Arrays (FPGAs), or a programmable-logic device, which performs certain operations, already developed or to be developed in future.

According to various embodiments, at least one part of an apparatus (for example, modules or their functions) or method (for example, operations) according to various embodiments of the present disclosure may be implemented as an instruction stored in computer-readable storage media, for example, in the form of a programming module. When the instruction is executed by one or more processors (for example, the processor 120), the one or more processors may perform a function corresponding to the instruction. The computer-readable storage media may be, for example, the memory 130. At least one part of the programming module may be implemented (for example, executed) by the processor 120. At least one of the programming module may include a module, a program, a routine, sets of instructions, or a processor for performing one or more functions.

The computer-readable storage media may include magnetic media (for example, a hard disk, a floppy disk, and a magnetic tape), optical media (for example, Compact Disc Read Only Memory (CD-ROM) and Digital Versatile Disc (DVD)), magneto-optical media (for example, floptical disk), and hardware device (for example, Read Only Memory (ROM), and Random Access Memory (RAM), and flash memory) specifically configured to store and perform a program instruction (for example, a programming module). Also, the programming instruction may include a high-level language code that can be executed by a computer using an interpreter, as well as a machine code that is created by a compiler. The hardware device may be configured to operate as at least one software module for performing operations according to various embodiments of the present disclosure, and vice versa.

The module or the programming module according to various embodiments of the present disclosure may include at least one of the aforementioned components, omit a part of the aforementioned components, or further include another component. The module, the programming module, or operations that are performed by another component may be executed sequentially, in parallel, repeatedly, or heuristically. Also, a part of the operations may be executed in a different order, may be omitted, or may add another operation.

According to various embodiment of the present disclosure, in a storage medium that stores commands, the commands are set to enable at least one processor to perform at least one operation when the commands are executed by the at least one processor, wherein the at least one operations may include operations: determining an input area of the display unit, corresponding to a first gesture acquired through the display unit functionally connected to the electronic device; determining a second gesture through at least one part of the input area; and adjusting at least one function of the electronic device, according to at least one of a time period for which the second gesture is sensed, a size of the second gesture, intensity of the second gesture, or a movement direction of the second gesture, in the at least one part of the input area.

In the electronic device and the control method thereof according to various embodiments, by controlling at least one function of the electronic device, based on a change between gestures acquired through at least one area of the display unit, a user can conveniently control the electronic device through the display unit.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A control method for an electronic device, the method comprising:

acquiring a first gesture through a display unit functionally connected to the electronic device and determining an input area corresponding to the first gesture acquired;

determining a second gesture in at least one part included in the input area;

controlling at least one function of the electronic device according to at least one of a time period for which the second gesture is sensed, a size of an area in which the second gesture is sensed, intensity at which the second gesture is sensed, or a movement direction in which the first gesture moves relative to the second gesture, in the at least one part of the input area; and displaying result data according to control of the at least one function of the electronic device, wherein said determining the input area comprises determining the input area based on the first gesture, when the first gesture is maintained for a predetermined time period.

2. The control method according to claim 1, wherein said controlling the at least one function of the electronic device comprises:

controlling the at least one function of the electronic device to a first degree, when the time period, the size of the area, the movement direction, or the intensity is a first time period, a first size of an area, a first movement direction, or first intensity; and controlling the at least one function of the electronic device to a second degree, when the time period, the size of the area, the movement direction, or the intensity is a second time period, a second size, a second movement direction, or second intensity.

3. The control method according to claim 1, wherein controlling the at least one function of the electronic device comprises:

determining whether text is displayed on the display unit; and selecting a word, a sentence, or a paragraph from the text, based on at least one of the time period, the size of the area, the intensity, or the movement direction.

4. The control method according to claim 1, wherein controlling the at least one function of the electronic device according to the time period for which the second gesture is sensed comprises:

zooming in/out content of an application to a first degree when the time period is a first time period; and zooming in/out the content to a second degree when the time period is a second time period.

5. The control method according to claim 1, wherein controlling the at least one function of the electronic device according to the movement direction in which the first gesture moves relative to the second gesture comprises:

moving a menu or content of an application in a first direction when the movement direction is a first movement direction; and moving the menu or the content in a second direction when the movement direction is a second movement direction.

6. The control method according to claim 1, wherein the display unit includes a first sub area and a second sub area, and controlling the at least one function of the electronic device comprises:

performing a first function as the function when the second gesture is acquired from the first sub area; and performing a second function as the function when the second gesture is acquired from the second sub area.

7. The control method according to claim 1, wherein controlling the at least one function of the electronic device comprises determining a direction of a user's line of sight with respect to the electronic device, based on the determined first gesture or the determined second gesture.

8. The control method according to claim 7, wherein determining the direction of the user's line of sight comprises:
displaying an object that is to be output through the display unit, in a first direction, when the direction of the user's line of sight is a first direction of a line of sight; and
displaying the object in a second direction, when the direction of the user's line of sight is a second direction of a line of sight.

9. An electronic device comprising:
a display; and
one or more processors functionally connected to the display,
wherein the one or more processors is/are configured to:
acquire a first gesture through the display and determine an input area corresponding to the first gesture,
determine a second gesture in at least one part included in the input area,
control at least one function of the electronic device, according to at least one of a time period for which the second gesture is sensed, a size of an area in which the second gesture is sensed, intensity at which the second gesture is sensed, or a movement direction in which the first gesture moves relative to the second gesture, in the at least one area of the input area, and
display result data according to control of the at least one function of the electronic device,
wherein the one or more processors are configured to determine the input area based on the first gesture, when the first gesture is maintained for a predetermined time period.

10. The electronic device according to claim 9, wherein the one or more processors is/are configured to control the at least one function of the electronic device to a first degree, when the time period, the size of the area, the movement direction, or the intensity is a first time period, a first size of an area, a first movement direction, or first intensity; and control the at least one function of the electronic device to a second degree, when the time period, the size of the area, the movement direction, or the intensity is a second time period, a second size of an area, a second movement direction, or second intensity.

11. The electronic device according to claim 9, wherein the one or more processors is/are configured to display a cursor corresponding to the first gesture in at least one area of the display.

12. The electronic device according to claim 9, wherein the one or more processors is/are configured to:
move the cursor in a first direction of the display when the movement direction is a first movement direction; and
move the cursor in a second direction of the display when the movement direction is a second movement direction.

13. The electronic device according to claim 9, wherein one or more processors is/are configured to display the input area as a user interface on the display.

14. The electronic device according to claim 9, wherein one or more processors is/are configured to adjust speed at which a function of an application of the electronic device is controlled, based on the at least one of the time period, the size of the area, the intensity, or the movement direction.

15. The electronic device according to claim 9, wherein the one or more processors is/are configured to stop controlling the function, or restores controlled function to a previous state before the function has been adjusted when the second gesture corresponds to the first gesture.

16. The electronic device according to claim 9, wherein the one or more processors is/are configured to control scroll speed, page turning speed, or zoom in/out speed, based on the time period.

17. The electronic device according to claim 9, wherein the one or more processors is/are configured to rotate content of an application in at least one direction of a clockwise direction or a counterclockwise direction, based on the movement direction.

18. The electronic device according to claim 9, wherein the one or more processors is/are configured to adjust the volume of the electronic device or an application, based on the movement direction.

* * * * *